US008429858B1

(12) United States Patent
Robinson et al.

(10) Patent No.: US 8,429,858 B1
(45) Date of Patent: Apr. 30, 2013

(54) SEMI-PERMANENT, 4-SEASON, MODULAR, EXTRUDED PLASTIC, FLAT PANEL, INSULATABLE, PORTABLE, LOW-COST, RIGID-WALLED STRUCTURE

(76) Inventors: Markus F. Robinson, Tunkhannock, PA (US); Scott D. Younger, Seattle, WA (US); Lawrence L Rutstrom, Kent, WA (US)

( * ) Notice: Subject to any disclaimer, the term of this patent is extended or adjusted under 35 U.S.C. 154(b) by 204 days.

(21) Appl. No.: 12/692,064

(22) Filed: Jan. 22, 2010

Related U.S. Application Data

(60) Provisional application No. 61/146,825, filed on Jan. 23, 2009.

(51) Int. Cl.
*E04H 1/00* (2006.01)

(52) U.S. Cl.
USPC .................. 52/79.5; 52/63; 135/97; 135/159

(58) Field of Classification Search .................. 135/97, 135/100, 121–122, 159, 116, 119, 143; 52/63, 52/82, 91.1, 91.3, 270, 284, 79.5
See application file for complete search history.

(56) References Cited

U.S. PATENT DOCUMENTS

| | | | | |
|---|---|---|---|---|
| 34,569 A | * | 3/1862 | Fitzgerald | 135/99 |
| 214,996 A | * | 5/1879 | Doane | 135/100 |
| 388,424 A | * | 8/1888 | Lindblad | 52/70 |
| 988,400 A | * | 4/1911 | Stonebridge | 135/99 |
| 1,481,019 A | * | 1/1924 | Luebbert | 52/83 |
| 1,728,356 A | * | 9/1929 | Morgan | 135/154 |
| 1,806,354 A | * | 5/1931 | Lange | 52/82 |
| 1,848,690 A | * | 3/1932 | Bayley et al. | 52/82 |
| 2,425,279 A | * | 8/1947 | Harris | 135/147 |
| 2,530,765 A | * | 11/1950 | Greenup | 135/98 |
| 2,864,389 A | * | 12/1958 | Smith et al. | 135/98 |
| 2,865,387 A | * | 12/1958 | Annibaldi | 135/145 |
| 2,928,404 A | * | 3/1960 | Klages | 135/98 |
| 2,967,534 A | * | 1/1961 | Silye | 135/143 |
| 3,016,115 A | * | 1/1962 | Harrison et al. | 52/18 |
| 3,119,153 A | * | 1/1964 | Martin | 52/82 |
| 3,139,958 A | * | 7/1964 | De Witt | 52/70 |
| 3,152,366 A | * | 10/1964 | McCrory et al. | 52/79.4 |

(Continued)

OTHER PUBLICATIONS

Domes for the World webpage http://www.dftw.org/?gclid=COflk67VkJ4CFQiA5QodrQW5qA.

*Primary Examiner* — William Gilbert
*Assistant Examiner* — James Ference
(74) *Attorney, Agent, or Firm* — Markus Robinson; Scott Younger; Larry Rustrom

(57) ABSTRACT

Low-cost, semi-permanent rigid-wall modular Yurt-type, peaked-roof structures, polygonally "round" (in plan view), made of modular, light-weight, water-proof cellular extruded plastic sheet panels that are easily portable, quickly erectable and dismountable, having a wide variety of uses. The modular panels are easily die-cut from any water-resistant, non-metallic, rigid material, preferably an extruded plastic, such as a polyolefin polymer. Few panel configurations are needed to form all the structural elements. In addition, multiple similar modular structures may be grouped to form larger compound structures with individual ones of the Yurts being assigned to individual persons or dedicated work space usages: disaster shelters, sleeping, gathering, storage, hygiene, medical treatment, schooling, entertainment, goods manufacture, cooking, eating, herding, etc. The key principles of the inventive technology are equally applicable to both single-walled and double-walled structures, the latter of which provide spaces between the walls for inter-panel insulation for cold-weather environments and passive ventilation in hot environments.

20 Claims, 16 Drawing Sheets

U.S. PATENT DOCUMENTS

| | | | | |
|---|---|---|---|---|
| 3,169,543 | A | * | 2/1965 | McGerty ............... 135/152 |
| 3,277,620 | A | * | 10/1966 | Martin ..................... 52/82 |
| 3,281,999 | A | * | 11/1966 | Lebson et al. ............ 52/82 |
| 3,333,376 | A | | 8/1967 | Marsters ................... 52/82 |
| 3,375,831 | A | * | 4/1968 | Serbus .................. 135/121 |
| 3,376,879 | A | * | 4/1968 | Huddle .................. 135/97 |
| 3,605,771 | A | * | 9/1971 | Fox et al. .............. 135/90 |
| 3,714,749 | A | * | 2/1973 | Aitken ..................... 52/70 |
| 3,727,355 | A | * | 4/1973 | Vachon .................... 52/82 |
| 3,766,693 | A | * | 10/1973 | Richards et al. ......... 52/71 |
| 3,835,602 | A | * | 9/1974 | Tuuri ....................... 52/82 |
| 4,064,662 | A | * | 12/1977 | O'Toole .................. 52/71 |
| 4,073,105 | A | | 2/1978 | Daugherty |
| 4,112,956 | A | * | 9/1978 | Small ..................... 135/99 |
| 4,133,149 | A | * | 1/1979 | Angress ................... 52/70 |
| 4,219,036 | A | * | 8/1980 | Biggs ................... 135/93 |
| 4,537,210 | A | * | 8/1985 | Montgomery .......... 135/87 |
| 4,542,759 | A | * | 9/1985 | Kyner, Jr. ............. 135/122 |
| 4,632,138 | A | * | 12/1986 | Irwin .................... 135/143 |
| 4,640,061 | A | * | 2/1987 | Trumley ................... 52/71 |
| 4,651,479 | A | * | 3/1987 | Kersavage ............. 52/80.1 |
| 4,663,898 | A | * | 5/1987 | Yacaboni ................ 52/82 |
| 4,672,779 | A | * | 6/1987 | Boyd ..................... 52/79.4 |
| 4,784,172 | A | | 11/1988 | Yacoboni |
| 4,850,160 | A | * | 7/1989 | Mullin, Jr. ............. 52/82 |
| 4,879,850 | A | * | 11/1989 | Glassco et al. .......... 52/82 |
| 5,033,243 | A | * | 7/1991 | Worms et al. .......... 52/245 |
| 5,184,436 | A | | 2/1993 | Sadler |
| 5,319,904 | A | | 6/1994 | Pascoe |
| 5,373,863 | A | * | 12/1994 | Prizio .................... 135/97 |
| 5,555,681 | A | * | 9/1996 | Cawthon ................ 52/63 |
| 5,715,854 | A | | 2/1998 | Andrieux et al. |
| 5,918,614 | A | * | 7/1999 | Lynch ................... 135/95 |
| 6,085,485 | A | | 7/2000 | Murdock |
| 6,129,102 | A | * | 10/2000 | Carter ................... 135/145 |
| 6,282,849 | B1 | | 9/2001 | Tuczek |
| 6,295,768 | B1 | * | 10/2001 | Romero ................... 52/82 |
| 6,390,110 | B1 | * | 5/2002 | Brown ................... 135/93 |
| 6,502,593 | B1 | * | 1/2003 | Stafford ............... 135/115 |
| 6,520,195 | B1 | * | 2/2003 | O'Neal et al. ......... 135/94 |
| 6,532,701 | B2 | * | 3/2003 | Williams ............... 52/71 |
| 6,554,013 | B2 | * | 4/2003 | Brown ................... 135/93 |
| 6,598,363 | B1 | | 7/2003 | Ferguson et al. |
| 6,658,800 | B2 | * | 12/2003 | Monson et al. ........ 52/81.1 |
| 6,742,533 | B2 | * | 6/2004 | Olson ................... 135/95 |
| 6,892,744 | B2 | * | 5/2005 | Feldpausch et al. ... 135/146 |
| 7,448,400 | B2 | * | 11/2008 | Jensen .................. 135/121 |
| 7,600,348 | B1 | * | 10/2009 | Kostka ................... 52/63 |
| 2004/0238021 | A1 | * | 12/2004 | Holub et al. ............ 135/97 |
| 2009/0272043 | A1 | | 11/2009 | Zwern |

* cited by examiner

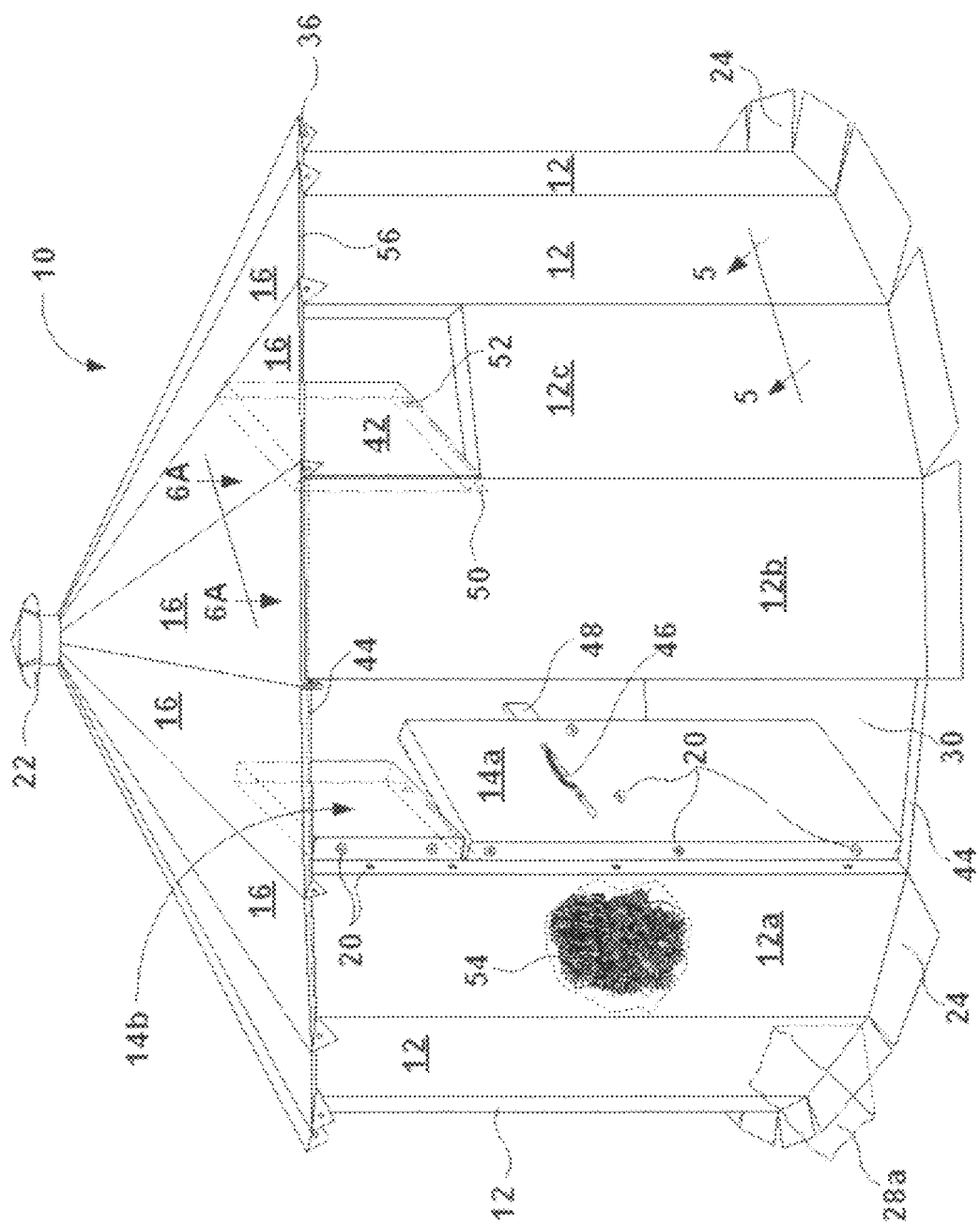

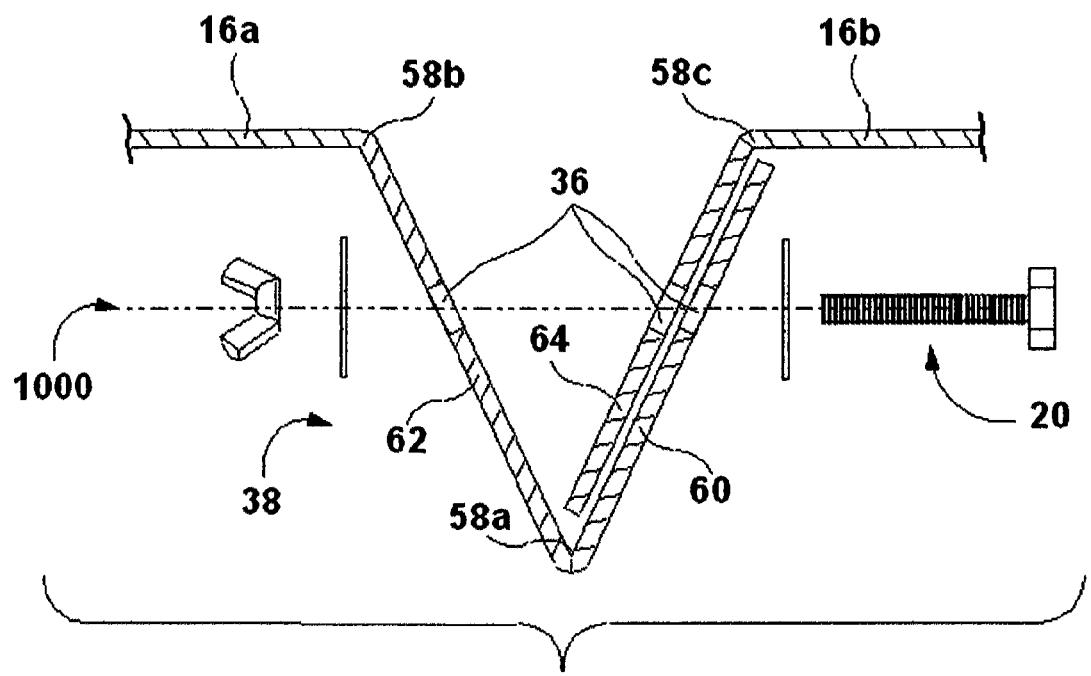
FIG.2A Exploded View
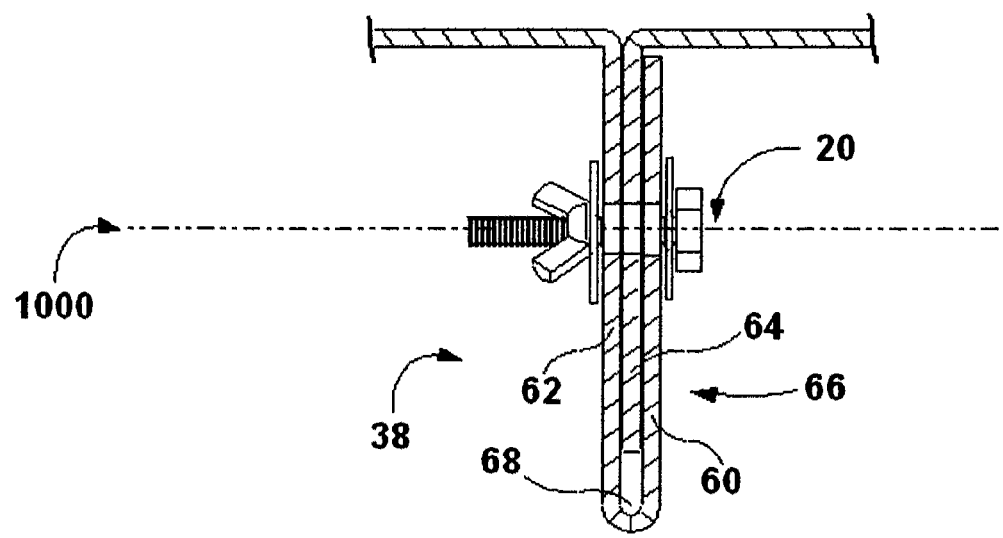
FIG.2B Assembled View

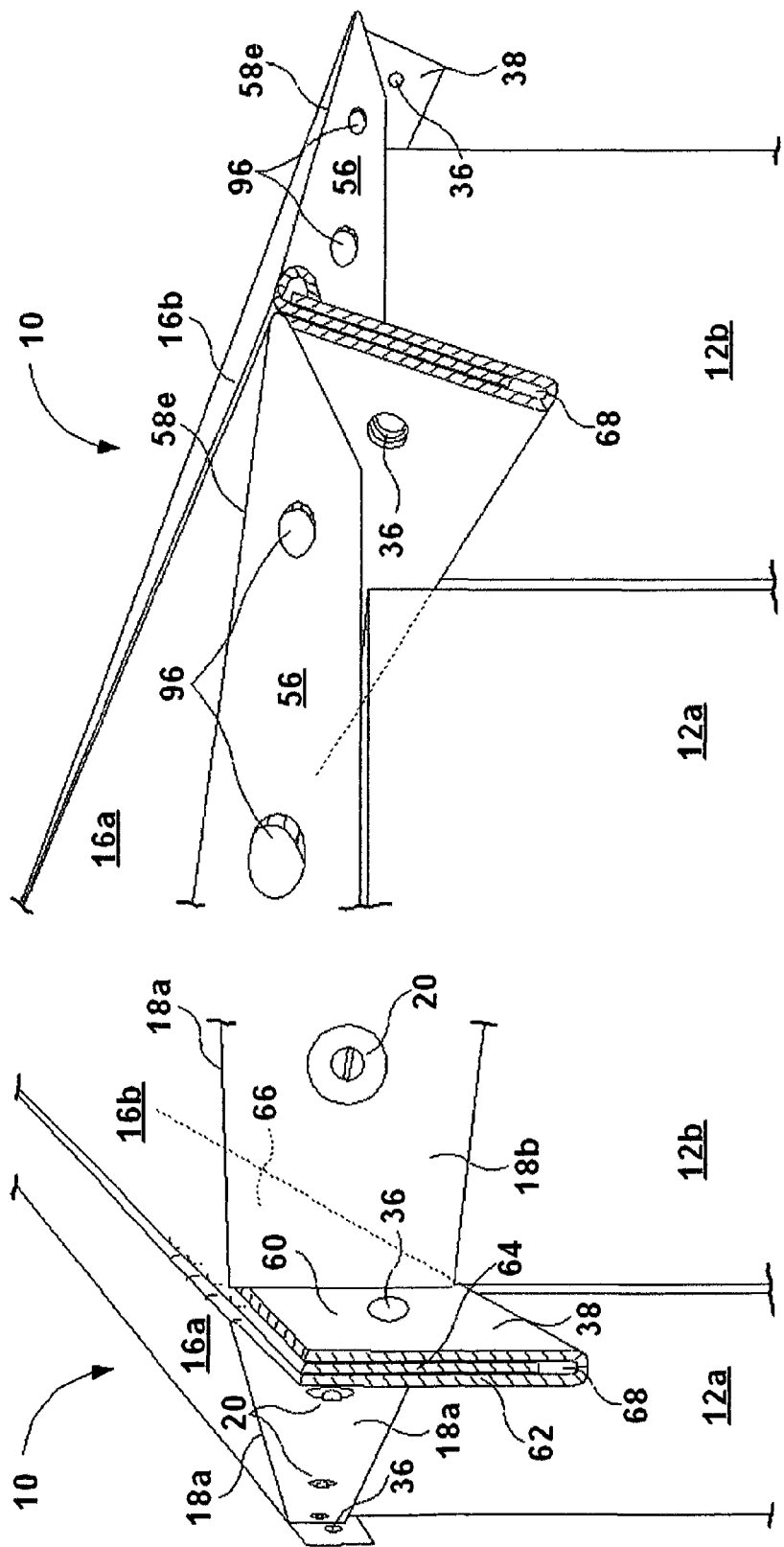

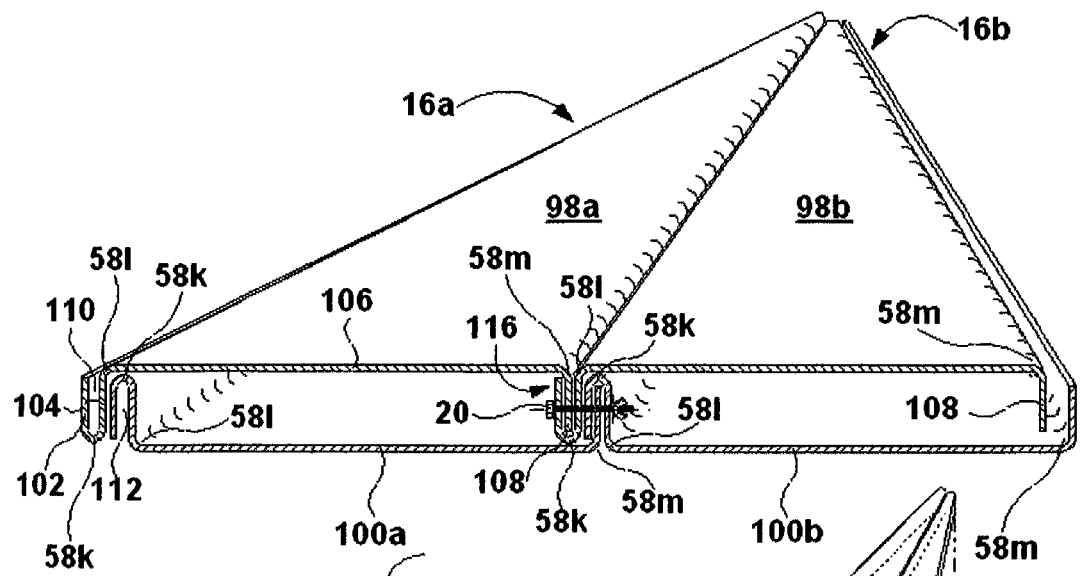
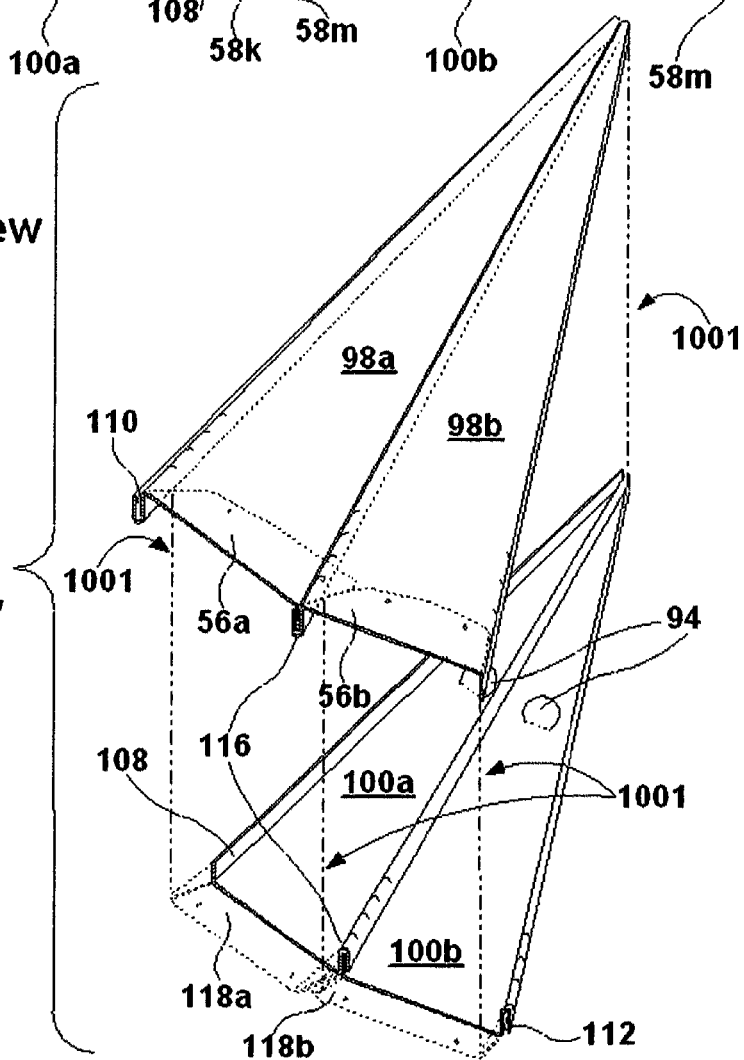
FIG.6A
Assembled View
FIG.6B
Exploded View

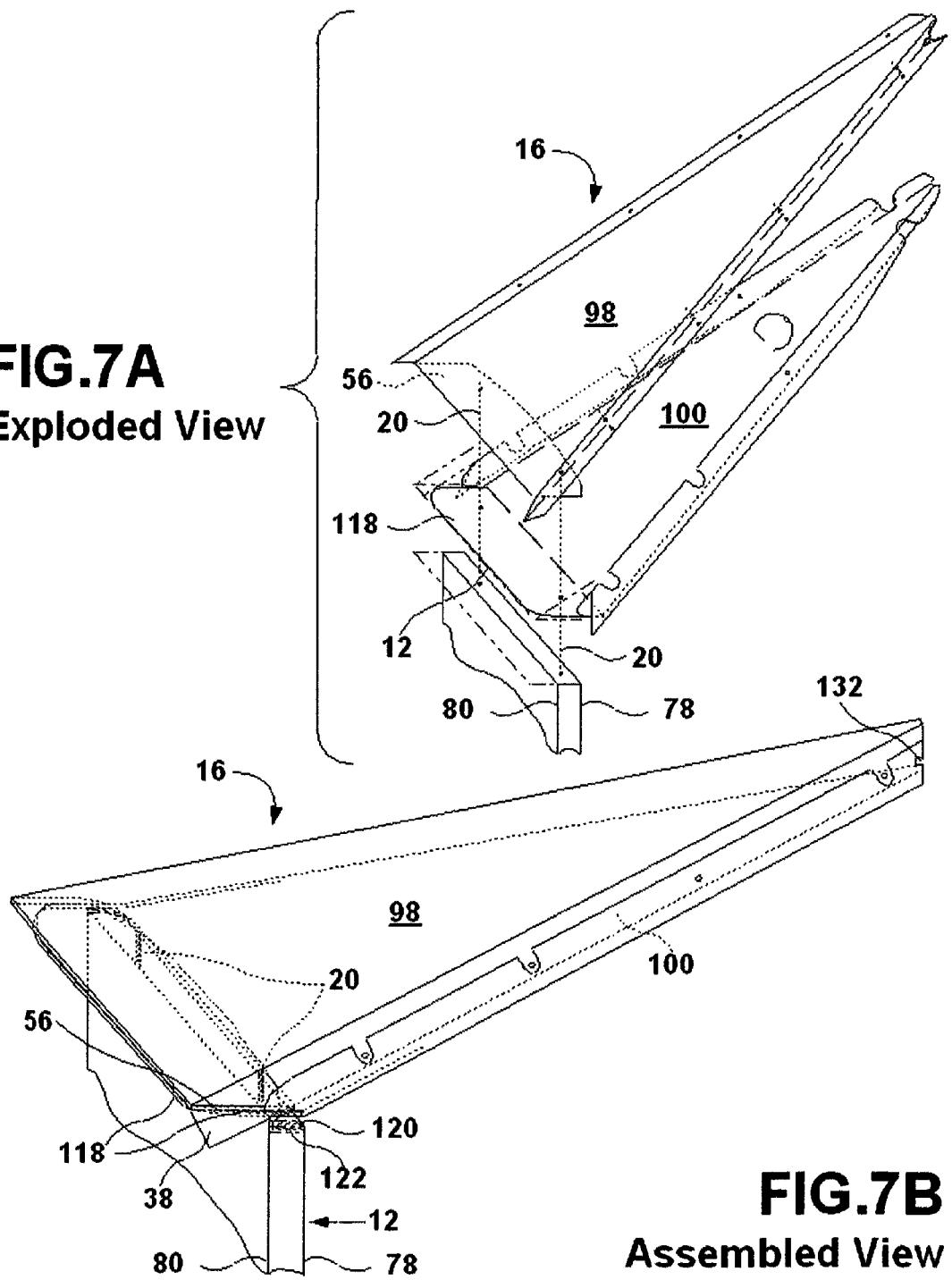

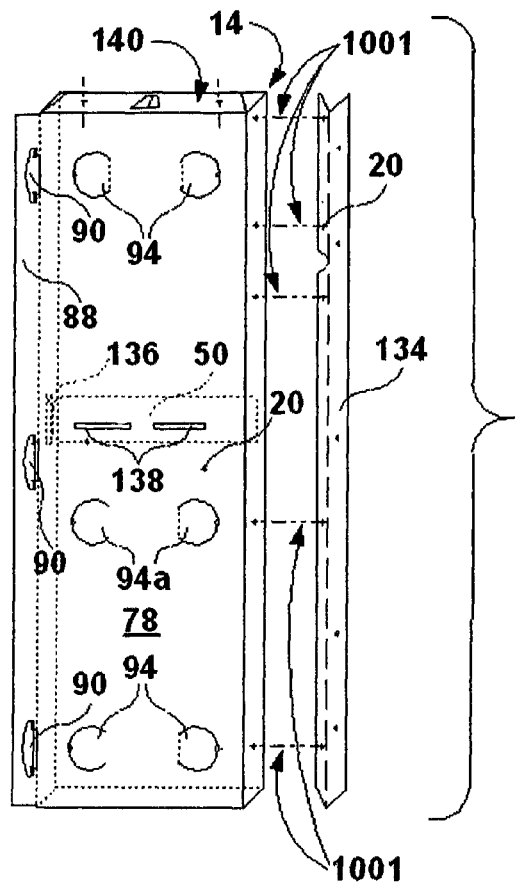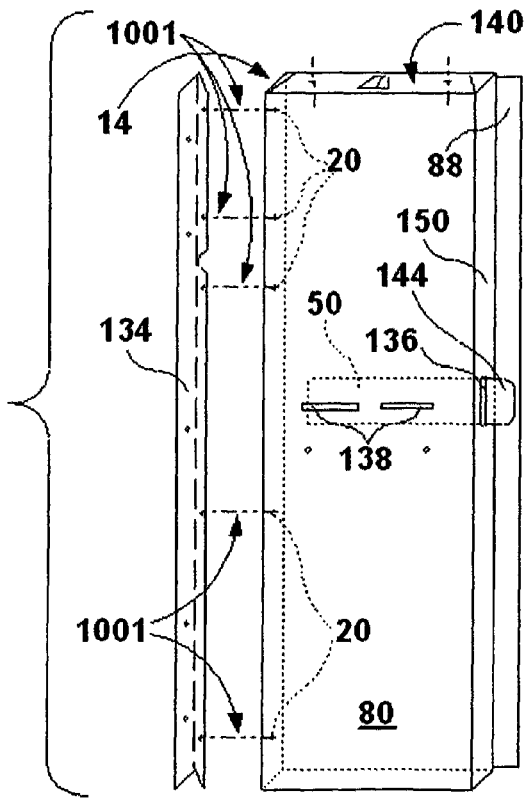
FIG.9A Exploded View
FIG.9B Exploded View

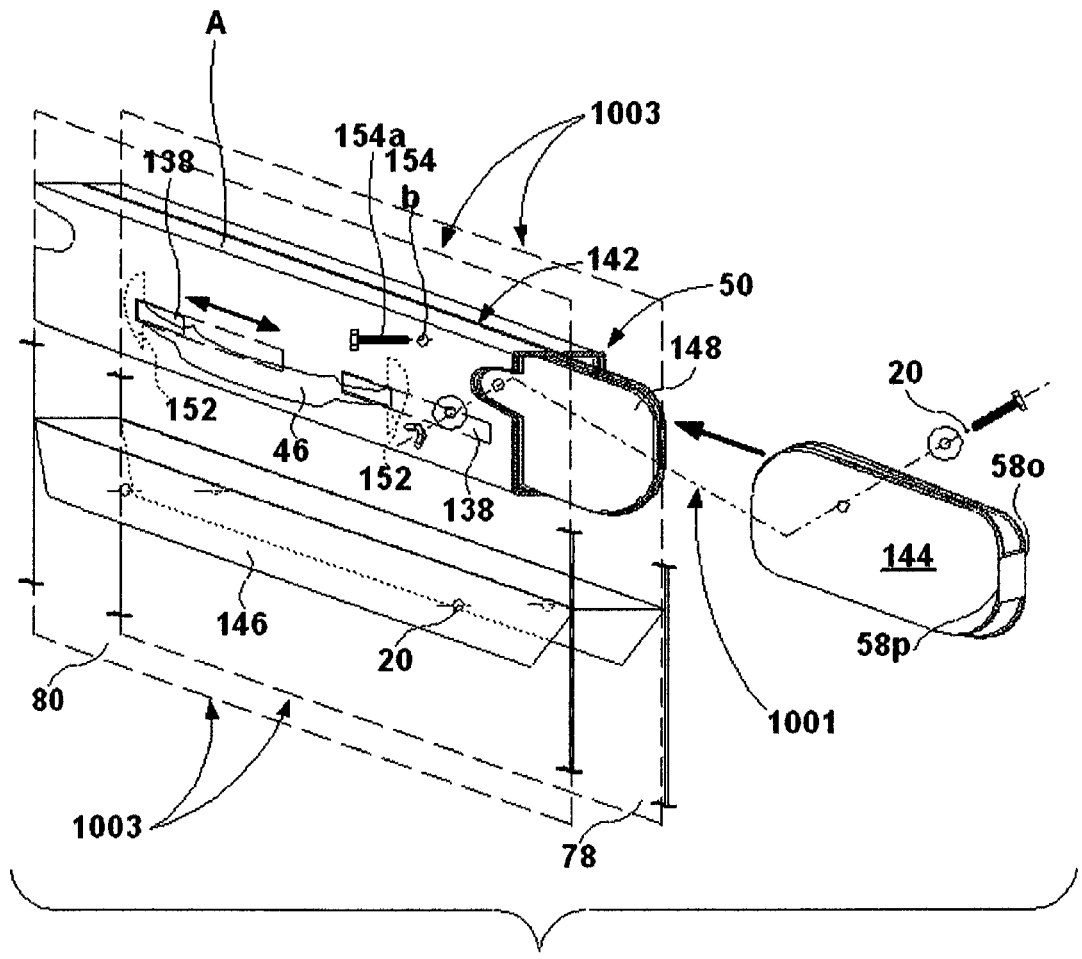
FIG.9C Exploded View
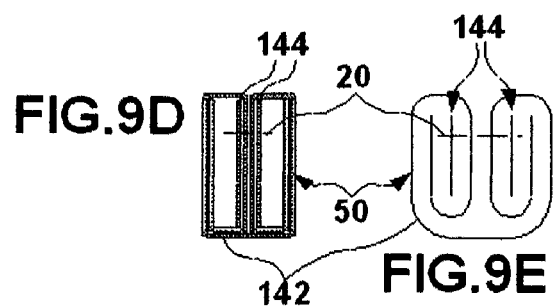

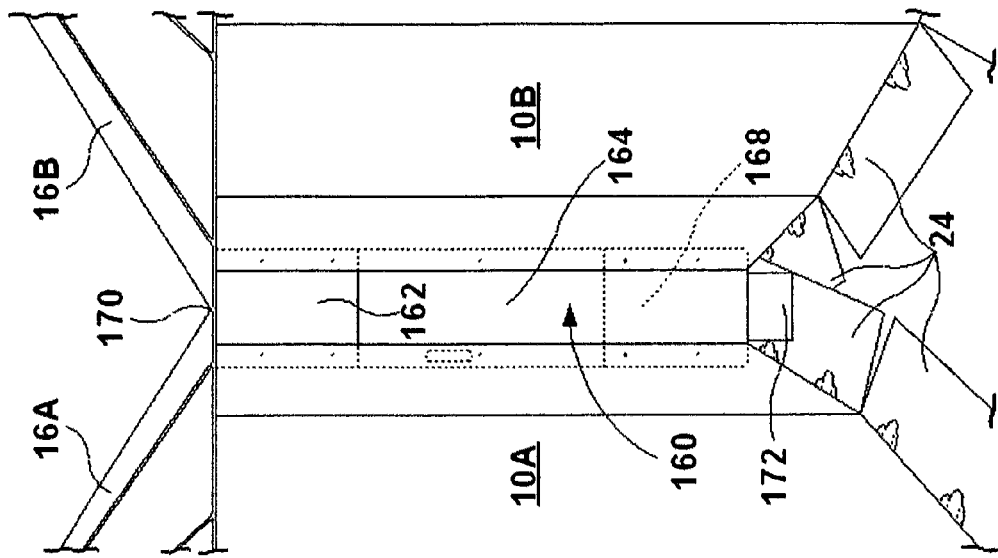
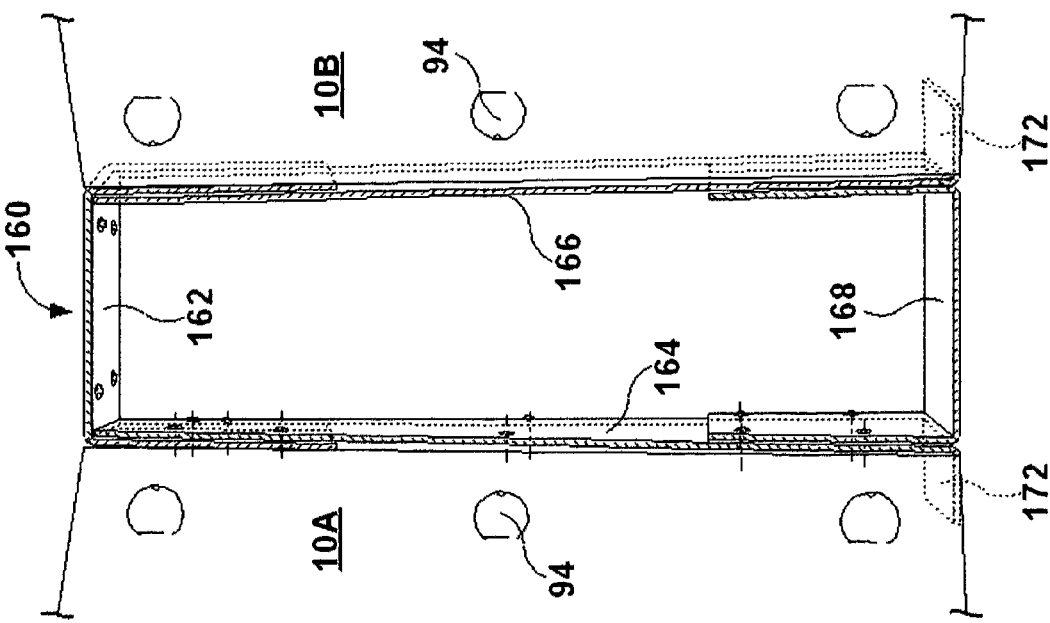

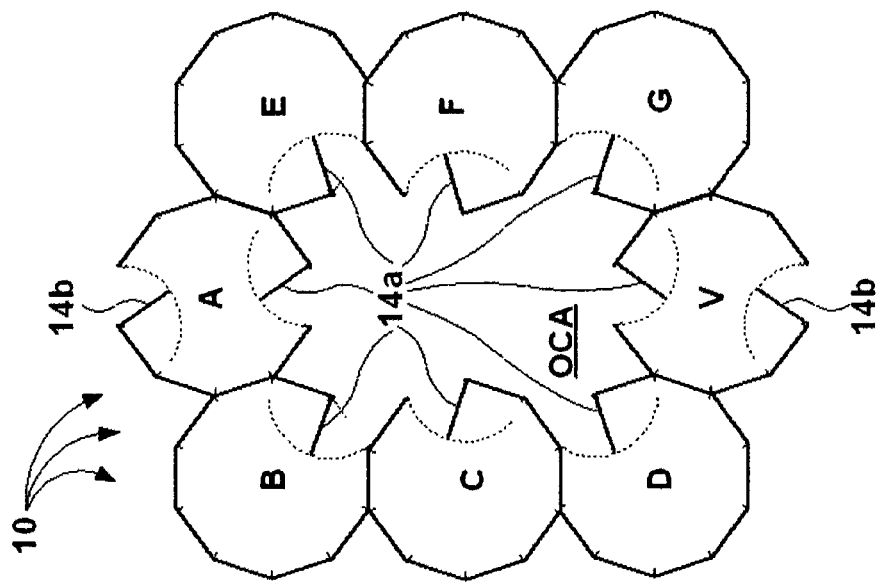
FIG.12C
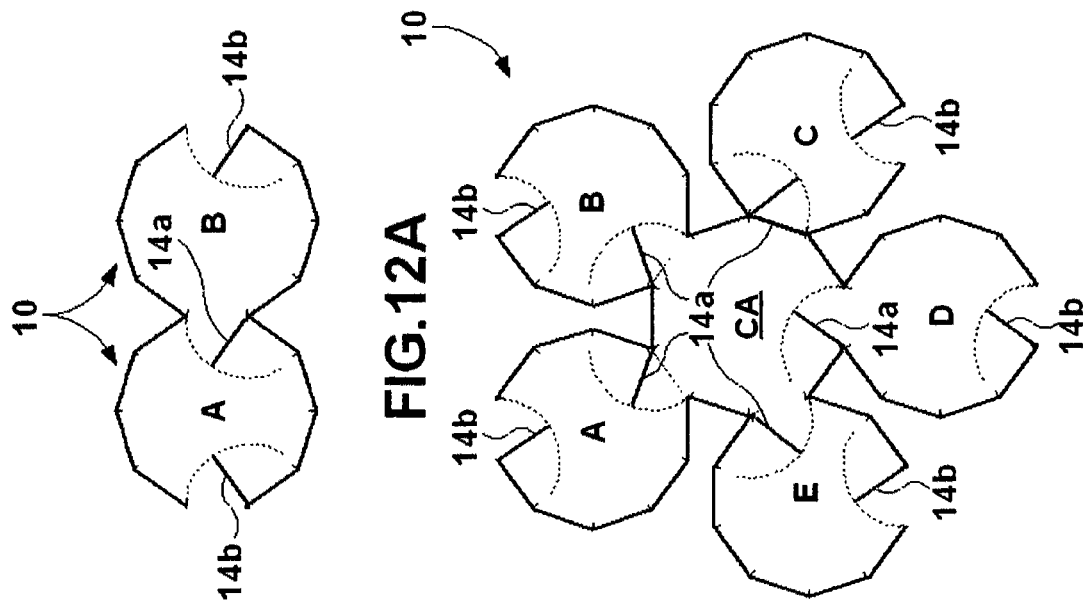
FIG.12A
FIG.12B

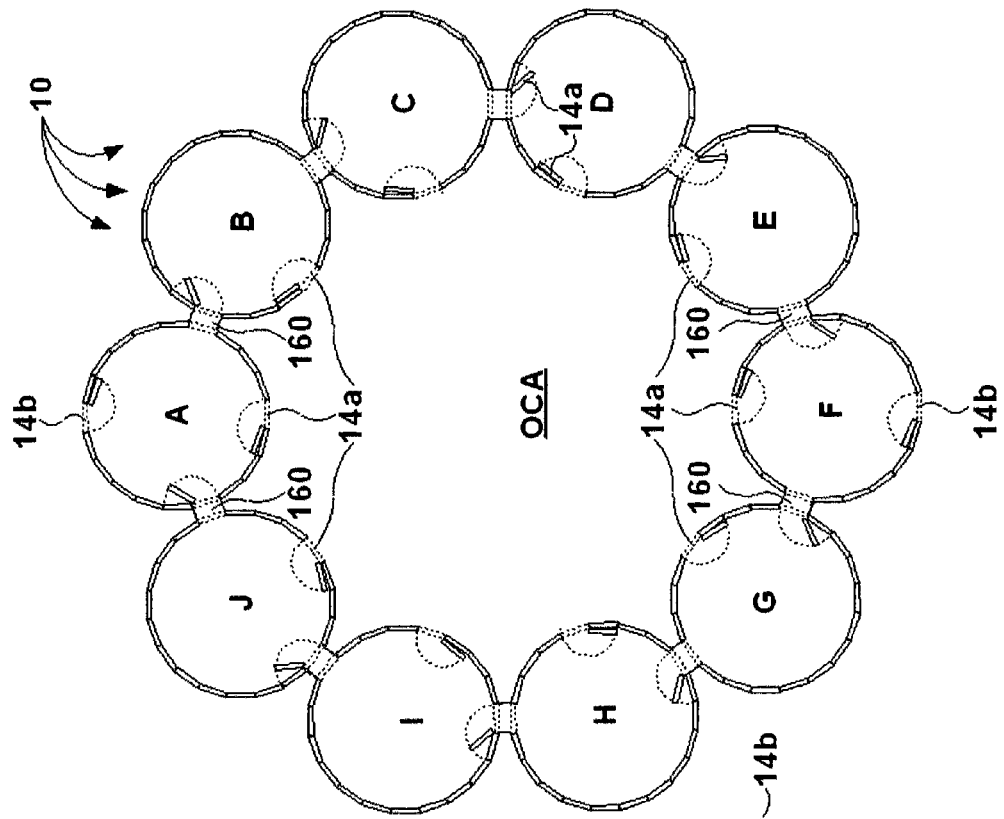
FIG.13C
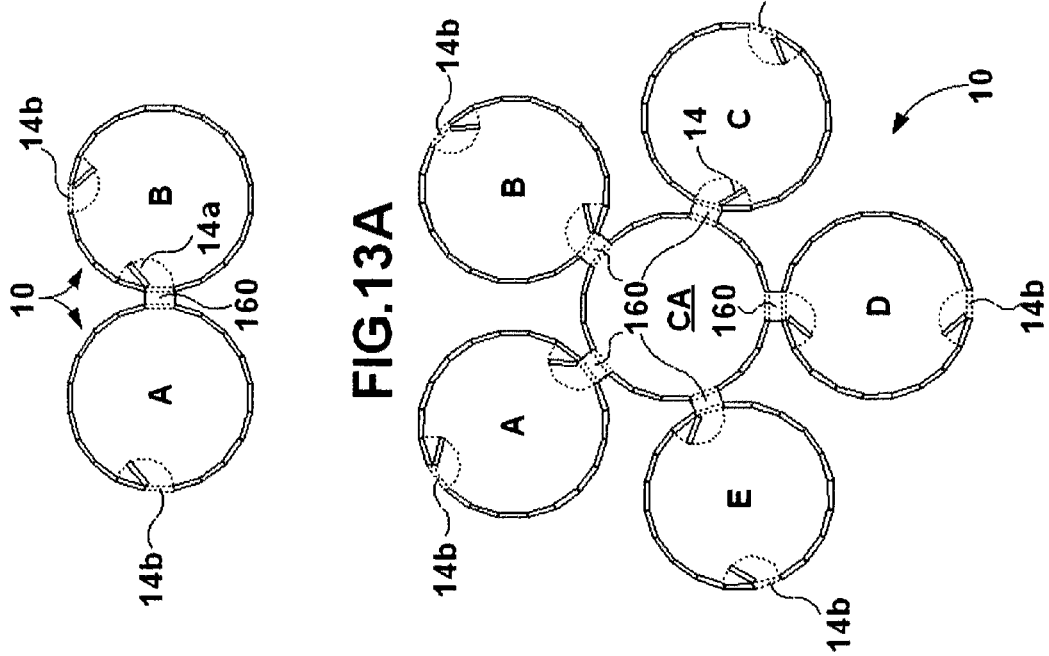
FIG.13A
FIG.13B

SEMI-PERMANENT, 4-SEASON, MODULAR, EXTRUDED PLASTIC, FLAT PANEL, INSULATABLE, PORTABLE, LOW-COST, RIGID-WALLED STRUCTURE

CROSS-REFERENCE TO RELATED CASES

This application is the Regular US Patent Application corresponding to US Provisional Application of the same title, filed by the same inventors, on Jan. 23, 2009, U.S. Ser. No. 61/146,825, the priority of which is claimed under 35 US Code, §§111 ff, including §§119 and 120.

FIELD

The invention relates to low-cost, semi-permanent rigid-wall modular structures, and more particularly to Yurt-type, polygonally "round" (in plan view), peaked-roof structures made of modular, light-weight, water-proof cellular extruded plastic sheet panels that are easily portable, quickly erectable and dismountable, having a wide variety of uses, primarily as temporary yet semi-permanent shelters for campers, field workers, military personnel, triage facilites, and for low income and displaced persons, including disaster and conflict refugee shelters. The modular panels are easily die-cut from any water-resistant, non-metallic, rigid material, preferably an extruded plastic, such as a polyolefin polymer. Only a few panel configurations are needed to form all the necessary elements of the structure. In addition, multiple similar modular structures may be grouped to form larger compound structures with individual ones of the Yurts being assigned to individual persons or dedicated work space usages: sleeping, gathering, storage, hygiene, medical treatment, schooling, entertainment, goods manufacture, cooking, eating, herding, etc. The key principles of the inventive technology are equally applicable to both single-walled and double-walled structures, the latter of which provide spaces between the walls for inter-panel insulation for cold-weather environments and passive ventilation in hot-weather environments.

BACKGROUND

There is an urgent need for low-cost temporary structures to house people and animals in the event of natural disasters and for refugees from conflict areas, not only for housing, but also for medical triage, food preparation and supplies storage. Although tents are the currently-used solution, they are inadequate for a wide range of reasons, including low internal height, relatively short life, relatively frangible, relatively impermanent in inclement weather, not insulated, subject to collapse in heavy snow-load environments, and for the more sophisticated, advanced material type of expedition tents, much too expensive.

In cases of natural disaster, there is an immediate unmet need for longer term useable structures, having a useful-life of on the order of 2-5 years until permanent housing is constructed for the homeless. A prime example is the 2004 Christmas tsunami that developed from a 9.1 magnitude subsea earthquake off the SW coast of Sumatra. The earthquake triggered a series of devastating tsunami along the coasts of most landmasses bordering the Indian Ocean, killing more than 225,000 people in eleven countries, and inundating coastal communities with waves up to 30 meters (100 feet) high. It was one of the deadliest natural disasters in recorded history. Indonesia, Sumatra, Sri Lanka, India, and Thailand were hardest hit.

Similar disaster examples are the refugee situations in the magnitudes 7.1 and 6.0 Haiti earthquakes of Jan. 13 and 19, 2010, and those resulting from the conflicts in Gaza, Somalia and the ethnic wars in various African countries. There, millions of persons are displaced and living in refugee camps in frayed tents, or huts of mud and dung wattle, discarded sheet metal, cardboard and worn sheets.

Even more prevalent are the estimated one billion squatters and homeless in the world. In almost all of the world's countries there are extensive slums, favelas, barrios, or shanty towns, typically on the edges of major cities and consisting almost entirely of self-constructed housing built of scraps of material without the landowner's permission. While these settlements may in time grow to become both legalized and indistinguishable from normal residential neighborhoods, they start off as "squats" with minimal basic infrastructure: no sewage system or drinking water, and if there is electricity, it is stolen from a nearby cable.

Temporary shelters are also used at conventions, trade shows, fairs and festivals, sporting events, for farm stands, and along trails or at camp grounds, to name a few.

There have been a number of design attempts in the prior art for temporary, rapid construction, light weight or field shelters, among them being: Zwern US Published Application 2009/0272-043 disclosing hexagonal yurts that can be clustered, made of corrugated, foam core, Al-faced polyisocyuranate panels. Both the side walls and roof are each made of one continuous panel. There is no roof or gutter overhang, and the roof is glued to the walls, and a cable is used to form tension rings top and bottom to hold it together. A complex cross-rib foundation system is used to support the floor. Since the walls and roof are multiple continuous perimetral panels, this structure is not easily man-portable for field erection as a temporary shelter.

Pascoe U.S. Pat. No. 5,319,904 discloses a clusterable prefab structure using arcuate surface panels to form a frustrum. Uses inner and outer fiberglass or Kevlar layers that are insulated between with foamed-in polyurethane. The structure appears to have primarily military use, in which the adjacent side wall, roof and floor panels are hermetically sealed by inter-engaging dados and grooves cinched together by external flanges and bolts, top and bottom.

Sadler U.S. Pat. No. 5,184,436 shows a portable rectangular structure of the Dutch barn style, having a slant roof and central ridge made of a continuous, multi-panel sheet forming both side walls and roof, with separate end panels. The sheet material is corrugated extruded polyethylene, and the two inwardly slanted side panels include exterior flaps that serve as hold-downs by use of sandbags. A yurt-type structure is not disclosed, nor is the structure easily clusterable.

Monson U.S. Pat. No. 6,658,800 discloses a dome made of a plurality of quadrilateral compound convex panels. They are double-walled panels, thermoformed of high-density polyethylene, which are joined at a lip-seam edge.

Yacoboni U.S. Pat. No. 4,784,172 discloses an emergency shelter of three-section combined wall and roof panels forming a pointed-top dome made of single layer corrugated plastic, held together with clips securing adjacent panels along external flanges/ribs. A box and support belt assembly may be used by a man carrying a bundle of the pre-folded panels into the field.

More complex and less pertinent ideas are illustrated in still other patent references; Tuczek U.S. Pat. No. 6,282,849 being directed to a highly complex exercise in proposing polyhedron dome buildings made of triangular panels interspersed with, and connected to, prismatic beams. The panels and beams are not for temporary, field erectable structures, being proposed as concrete beams supporting SIP panels of plywood with foamed interor layers.

Andrieux U.S. Pat. No. 5,715,854 discloses an igloo made of bowed panels pleated at the upper edge to compensate for curvature deformation. The panels are single-layer and connected by side edge, ball-and-socket connectors. The roof dome top is a single convex piece.

Daugherty U.S. Pat. No. 4,073,105 discloses a toy or display structure formed of trapezoidal or triangular structures made of single piece, rigid plastic or metal panels, having curled edges that slidingly interlock. A single roof panel having creases forming edges of a shallow pyramid is provided.

Murdock U.S. Pat. No. 6,085,485 discloses steel SIPs formed of two spaced sheet steel sheets (skins) having Z or C internal connecting ribs with insulation provided between the two skins. Overlapping edges of panels are connected by self-sealing Tek fasteners.

Ferguson U.S. Pat. No. 6,598,363 discloses a modular single ridge barn-like structure made of corrugated single-layer panels having side edge margins that include alternating tabs and eyes for linking panels together along the edges. Prefab eave and ridge beams having holes and pegs join a gable roof made of the same panels to the vertical side walls. Although no materials are specified, the corrugated form of the sheets appear to be steel, aluminum or fiberglass.

U.S. Pat. No. 6,895,772 of Icosa Village is directed to multiple panels folded into modular polygonal beams that interlink, first into triangular modular double-walled panels, and in turn the triangular panels are assembled into icosahedral dome structures. Tetrahedral windows may be inserted in the center opening of the triangular modules.

Finally, Domes for the World, (177 Dome Park Place, Italy., TX., 76651), discloses its mission is to provide low cost, 10 rebar-reinforced, permanent concrete dome shelters for third-World regions. The DFTW system uses an air inflated dome atop cylindrical wall forms that are sprayed with concrete over rebar to make a monolithic shell.

While these approaches suggested in the prior art are interesting, for the most part they are complex, not light-weight or modular enough to be simply portable, do not address all the needs of a semi-permanent, sound, fully functional shelter, that is simple to install in the field by unskilled workers, yet results in a highly robust structure that is clusterable into a wide variety of configura-tions to provide for a wide range of needs over many years of use.

Accordingly, there is a pressing need for improvements in rugged, temporary shelters that are low cost, simple to manufacture, light weight for easy portability to an erection site, simple to erect by unskilled manual labor without complex tools, yet are weather and pest-proof and flexible in design to provide cluster-buildings for a wide range of housing and support uses for extended service life.

THE INVENTION

Summary, Including Objects and Advantages

The invention comprises low-cost, semi-permanent, Yurt-type, polygonally "round" (in plan view), meaning more than 4 sides, peaked-roof, rigid, walled structures made of modular, light-weight, water-resistant, diecut sheet goods panels that are self-sustaining (self-standing). A presently preferred example is the use of linear cell-type (cells parallel to the longitudinal axis of the panel length) extruded plastic sheet panels. The package of a plurality of panels required for assembly into a modular Yurt structure is light enough in weight to be easily portable by manpower, mule, horse or camel. They are easily field-assembled into fully erected structures without the aid of tools or scaffolding, and may be disassembled for moving the structure as needed. The individual inventive Yurt structures are modular and universal, in that they have a wide variety of uses, primarily as temporary yet semi-permanent (up to several years use) shelters for campers, low income and displaced persons, such as disaster and conflict refugee shelters, and for medical triage, food preparation and supplies storage.

The panels are easily die-cut from extruded plastic sheets having a pair of parallel continuous exterior wall panels or sheets, spaced on the order of 1/8" to 5/16" (3-14 mm), preferably about 3/16"-5/16" apart, between which extend cross member webs generally normal to the parallel sheets spaced from about 1/8 to 1/4" apart. The resulting extruded panel sheets present a rhomboidal segmented channel cross-section. The wall and roof material sheets are formed from a wide variety of materials, such as plastic sheets, monolithic sheets formed by melt extrusion of a polyolefin polymer, polyethylene being presently preferred. In an alternate implementation, the panel sheets may be made as a laminate, gluing or melting (heat or RF bonding) a first face and a second face together with a corrugated sheet between, an example being a corrugated plastic or cellulosic material such as kraft paper that has been impregnated with a plastic material for water resistance. In addition, other types of plastic may be used, including more advanced plastics, co- and ter-polymer plastics, and laminates of plastics with paper, metal and other materials. Panels may be formed of any weather resistant, durable, semi-rigid material having the characteristics of: 1) memory (to retain crease lines); 2) sufficient rigidity to remain planar across the surface of the panels; 3) sufficiently foldable to make and retain creases that approach 180°; and 4) sufficiently resilient so that folded seams do not break with repeated folding.

The panel materials may, and preferably do, incorporate a fire retardant material. The presently preferred polyethylene material is an opaque, but translucent, white, for a pleasant diffuse illumination on the interior by ambient external light, but may be opaque, or transparent, in whole panels or in sections of the panels. The panel materials may incorporate a color or may be painted. The materials and configurations of the various opaque, translucent or transparent sections may easily be selected by those skilled in the art, with the primary restraint being the cost of materials and fabrication of the more advanced materials.

Only a few panel configurations are required to fabricate an entire structure. The modular, planar, identical panels may be interlocked or fastened together in a wide range of variations to form all the necessary elements of the structure. Since there are a plurality of upstanding side walls, typically from about 6 to 20 in number, the plan view is of a polygonally round footprint. In addition, multiple similar modular structures may be grouped to form larger compound structures with individual ones of the Yurts being assigned to individual persons or dedicated work space usages: sleeping, gathering, storage, hygiene, medical treatment, schooling, entertainment, goods manufacture, cooking, eating, etc., work spaces.

The 'origami architecture' nature of the inventive yurt-type structures permits creating 3-Dimensional self-standing, rigid-walled shelters from unfolded 2-dimensional flat panel compon-ents, which makes these shelters very efficient to ship "flat", in kit-type bundles of all the panel sheets necessary to field-construct an inventive yurt structure (optionally with all included fastening hardware) to remote locations, where disaster disruption of local infrastructure makes delivery of larger building components and assembly equipment highly problematical.

The inventive Yurt structures are configured in a range of included sizes and features, ranging from basic to more complex. Unique features of the inventive rigid-wall Yurt-type structure include:

- Up to full man-height (standard 6') at the eaves and taller in the center of the peaked roof;
- Dry Interior implemented by a simple but extremely effective interlocking gutter connections for the wall and roof panel intersections that render the interior truly waterproof without the use of tapes, glues, or other advanced material sealing techniques;
- Insulatable—the modular, repeat-panel configuration permits the structure to be configured with a double wall, permitting insulation by use of any locally available biomass inserted between the walls by hand, such as straw, packaging foam scraps, rushes, crumpled newspaper, and the like;
- Passive Ventilation between double-walled wall and roof panels
- Use of pressure seals to create wind and waterproof walls in double-walled implementations The use of panel sheet material like polypropylene, that has both sufficient rigidity and also sufficiently flexibility to create a face-to face seal, permits the creation of such a pressure seal.
- Genuine modularity at the shelter level that permits individual shelters to be connected to up to 5 other shelters so that a huge number of multi-room shelters may be arranged in an inter-connecting compound structure;
- Customizable—each of the inventive shelter modules is customizable with a wide variety of full door, half-door (Dutch door) and window panel optional accessories, all using the same panel folding and interlocking techniques;
- Internally lockable, bolting doors and window panels;
- Apertured, water-tight, roof panel that permits installation of through-the-roof chimneys for an internal wood-burning stove or other heating device that produces a hot exhaust or for hot weather ventilation;
- Inter-connection panels configured as short, enclosed tunnels permitting direct linking of spaced-apart, inventive modular Yurt structures together, or for entrances to individual structures; these panels can be oriented normal to a side wall panel or at an angle, forming angular exterior additions; and
- Ground flaps, comprising extensions of the walls that are folded, preferably outward (but may be folded inward), to provide rain splash protection, and a foot on which rocks, dirt or other materials may be piled to anchor the structure to the ground for protection against wind blow-away.

BRIEF DESCRIPTION OF THE DRAWINGS

The invention is described in more detail with reference to the drawings, and to Appendix A, a parts list, and Appendix B, 16 annotated plan view figures of the die-cut panels, which together will assist in understanding forming and assembling the inventive structures illustrated in the Specification drawings, in which:

FIG. 1B is an isometric view of a double-wall, twenty-sided "Tek" yurt of the inventive design, showing dutch door 14a and latch construction 48 latching window and an exterior wall cut-away to show insulation;

FIG. 2A is an exploded elevation view of a gutter end of the inventive yurt of FIG. 1A showing the interlock of the adjacent single wall roof panels, with the bolt to secure them together exploded away to illustrate the assembly;

FIG. 2B is an assembled section view through the secured-together roof panels of the inventive yurt of FIG. 1A along the lines 2B-2B showing the roof panels assembled and secured together, with the depending interior rib;

FIG. 3A is an isometric of the exterior spill end of the assembled gutter construction of a single-wall inventive yurt as shown in FIG. 1A;

FIG. 3B is an isometric of the exterior spill end of the gutter of a double-wall inventive yurt also illustrating the soffit spanning between the perimeters of the roof and the inner wall panel of the wall module;

FIGS. 5A-5C are a series showing double wall panel construction, fastening to adjoining panels and flex-seal feature, in which FIG. 5A is a section view through the vertical side wall of the double-walled yurt of FIG. 1B taken along the line 5-5, FIG. 5B shows in enlarged section the assembly and fastening of adjacent double wall modules and the formation of an interior flex seal, and FIG. 5C is a section view through an assembled double-wall module before fastening to adjoining wall modules on each side;

FIGS. 6A and 6B show details of the roofing modules of the double-walled yurt of FIG. 1 B, in which FIG. 6A is a an assembled section view taken along the line 6A-6A, extended in isometric, to illustrate how the roof and ceiling panel edge flaps are folded and interleaved, and FIG. 6B is an exploded isometric view showing how adjoining pairs are assembled to form the double roof modules;

FIGS. 7A and 7B show details of the securing of a roof module to a wall module, in which FIG. 7A is an isometric exploded view of roof module panels in relation to the top of a co-ordinate wall module, and FIG. 7B is an isometric assembled view of the roof module secured to the closure panels of the wall modules with the formation of a soffit structure above the wall eave that closes off the underside of the exterior perimeter of the roof module;

FIGS. 9A-E are a series of isometric, section and schematic drawings showing a double-walled door for the double-walled yurt of FIG. 1B, in which FIG. 9A is an exploded isometric of the interior side of the door showing the hinge piece; FIG. 9B is an exploded isometric of the exterior side of the door showing the hinge piece; FIG. 9C is an exploded isometric showing the door deadbolt construction and the lock base on which it rests as well as the bolt end and bolt locking bolt; and FIGS. 9D, 9E show an end view, and schematic, respectively, of the deadbolt body cross section;

FIGS. 11A and 11B are a pair of drawings showing an example of a connecting tunnel installed between two double-walled yurts to provide a weather resistant passageway, FIG. 11A being an isometric interior view from one yurt into another, and FIG. 11B being an exterior elevations showing the tunnel connecting two yurts;

FIGS. 12A-12C illustrates in plan view examples of the wide range of architectural variety of configurations of multiple single-wall yurts connected to each other at common walls; FIG. 12A showing two yurts; FIG. 12B showing a 6-yurt configuration with a roofed common center area; and FIG. 12C showing an 8-room yurt compound with an open common atrium; and FIGS. 13A-13C illustrates in plan view examples of the wide range of architectural variety of configurations of multiple double-wall yurts connected to each other via connecting tunnels; FIG. 13A showing two yurts; FIG. 13B showing a 6-yurt configuration with a roofed common central area; and FIG. 13C showing a 10-room yurt compound with an open common atrium.

DETAILED DESCRIPTION, INCLUDING THE BEST MODES OF CARRYING OUT THE INVENTION

The following detailed description illustrates the invention by way of example, not by way of limitation of the scope, equivalents or principles of the invention. This description will clearly enable one skilled in the art to make and use the invention, and describes several embodiments, adaptations, variations, alternatives and uses of the invention, including what is presently believed to be the best modes of carrying out the invention.

In this regard, the invention is illustrated in the several figures, and is of sufficient complexity that the many parts, interrelationships, and sub-combinations thereof simply cannot be fully illustrated in a single patent-type drawing. Several of the drawings show phantom lines labeled '1001' that illustrate how an exploded view lines up, or labeled '1002' to illustrate how a swinging door opens, or labeled '1003' to illustrate the continuation of an additional wall panel. Several of the drawings show phantom centerlines labeled '1000'. For clarity and conciseness, several of the drawings show in schematic, or omit, parts that are not essential in that drawing to a description of a particular feature, aspect or principle of the invention being disclosed. For example, many of the access portals die cut into the interior panels of the double-walled yurt which permit access to the vertical studs and ceiling trusses for insertion and tightening of the connecting bolts and wing nuts are not shown, so as to not clutter the drawings. It should be understood that such die cut access portals may be provided in locations as needed for convenient access to accomplish ease of fastening during assembly. Thus, the best mode embodiment of one feature may be shown in one drawing, and the best mode of another feature will be called out in another drawing.

The Specification text and Figures, including the annotated drawings in Appendix B, illus-trate the die-cutting manufacture, the assembly of individual panels, and their erection into many different embodiments of the inventive modular structures (yurts), in terms of features, sizes, complexity and functional utility. By careful review of the detailed text and drawings of this Application, one of ordinary skill in the art will fully appreciate the features of the inventive modular structures, the configuration of the panels, and how to assemble and use the structures.

Figure 1A:
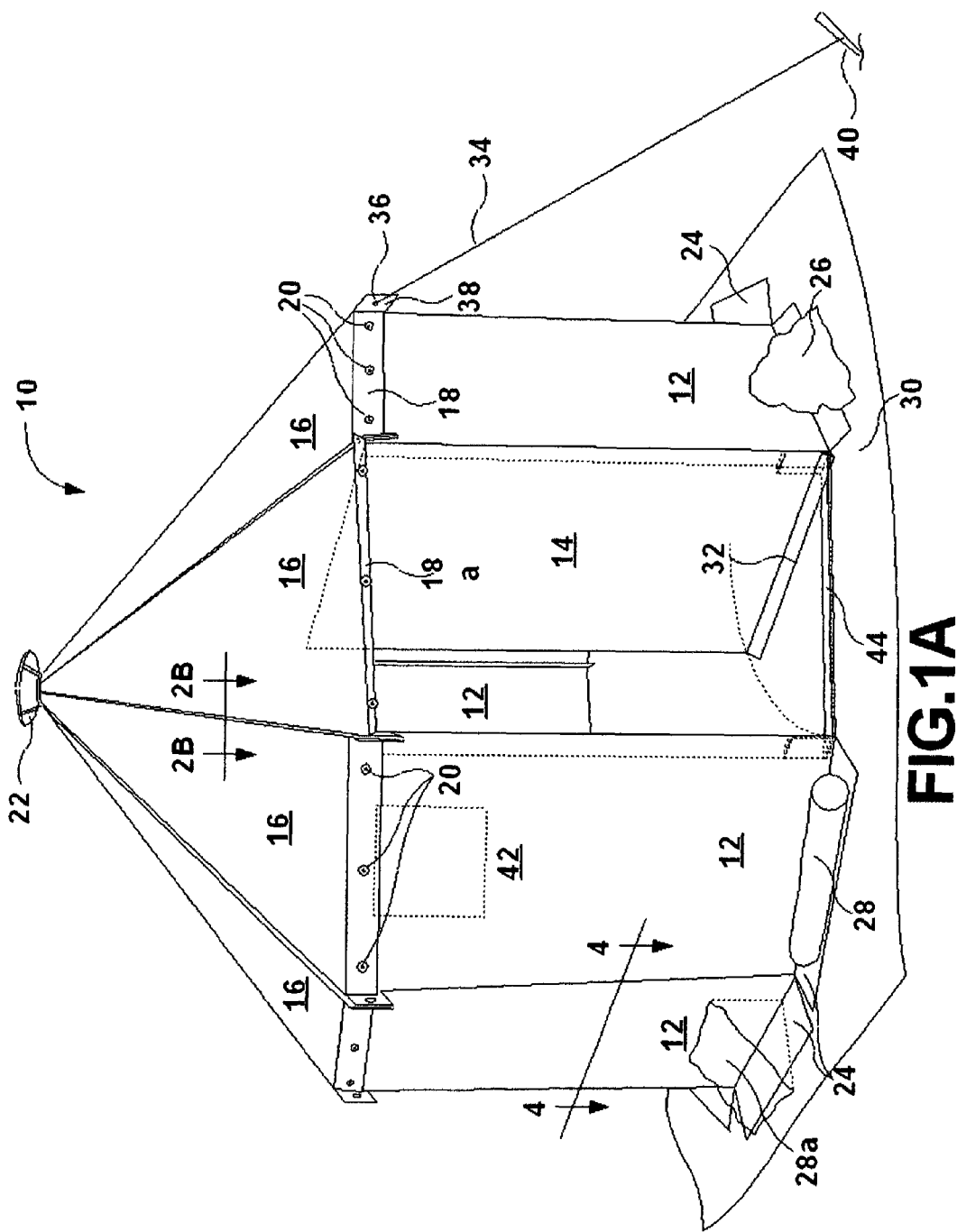
FIG. 1A is an isometric view of a single-wall, ten-sided "Lite" yurt in accord with the principles of the invention, showing exterior hold-down flaps and optional guy line securement system.
Figure 8A:
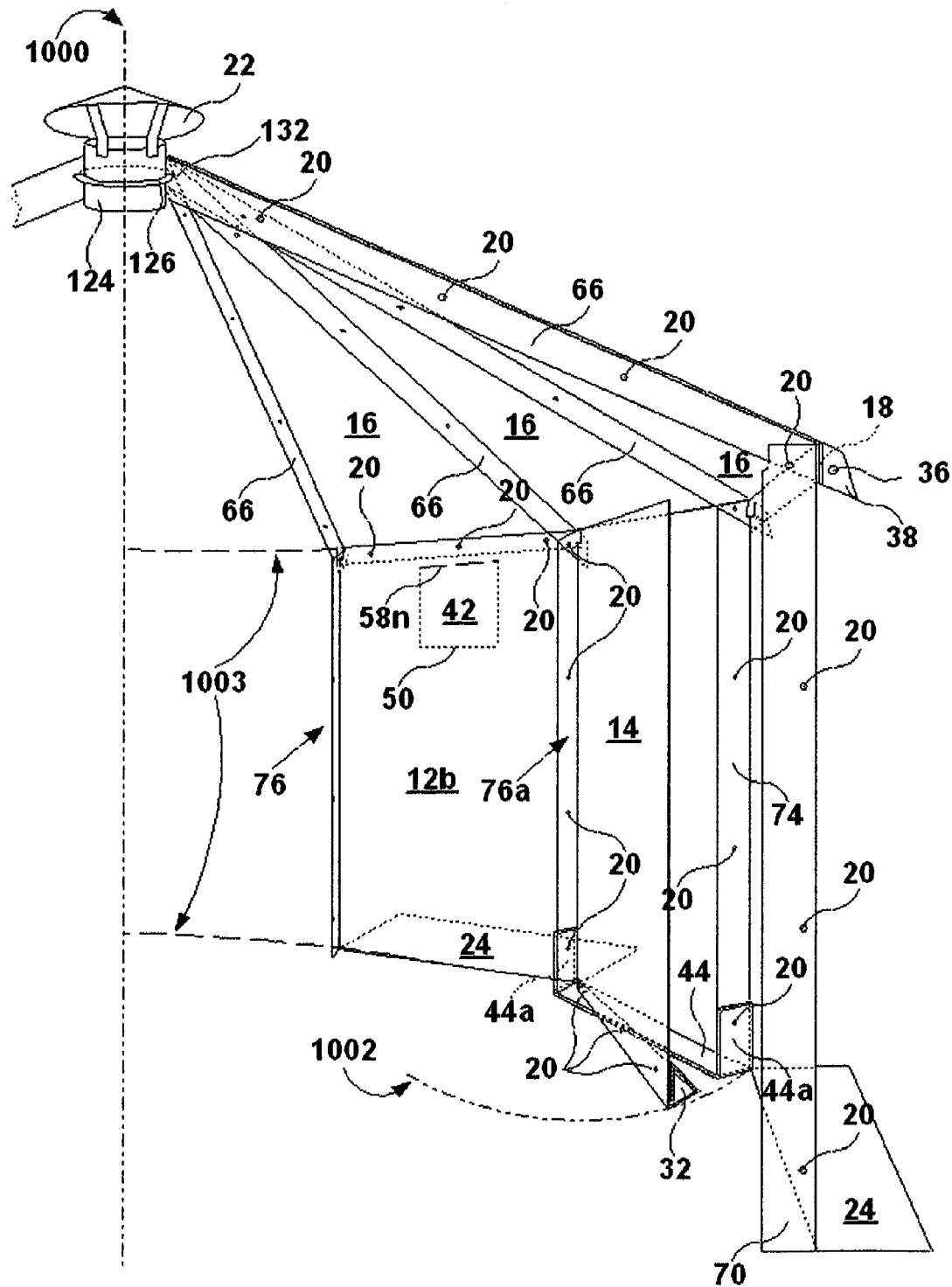
FIG. 8A is an isometric from the interior of a single-walled yurt of FIG. 1A showing several side wall and roof panels, terminating in a galvanized metal roof vent having a collar and flange functioning as the central compression ring of the roof.

FIGS. 1A and 1B show in isometric views, respectively, a first, single-wall, ten-sided "Lite" yurt (FIG. 1A), and a double-wall, twenty-sided "Tek" yurt (FIG. 1B), 10, in accord with the principles of the invention. In the single-wall embodiment of FIG. 1A there are shown nine identical modular wall panels 12, the tenth panel being a door 14 hinged by a flap along one edge. The hinge flap on the edge is the male part of the vertical supporting rib, and thus part of the structural support formed by vertically aligned edge flaps of adjacent wall panels. Ten triangular roof panels 16 include an outer eave flap 18 that, in nine of them, is folded down over the corresponding upstanding wall panel 12 and fastened thereto by a plurality of bolt and wing nuts 20, the wing nuts preferably being on the interior. For the tenth roof panel 16a, the eave panel is folded slightly up along the fold line 18a, to direct rainwater off toward the side gutter assemblies 38 described in more detail with reference to FIGS. 1A and 2A. This 'gutter' over the door does not connect to the roof gutters 38. Rather, it simply diverts the water off to the sides of the door. The roof peak terminates in a vent assembly 22 which includes a compression ring to which notches at the converging rafter rib apices of the roof panel triangles are compression fitted, as best seen in FIG. 8A. The base of the nine wall panels includes an outwardly folded base flap 24 onto which may be placed rocks 26, sandbags 28, dirt berms 28a, tent pegs or the like to secure the structure to the ground.

The ground should be sloped away from the walls so that rainwater is directed away from the yurt. It should be noted that where the use of the inventive yurt structures is for human habitation or goods storage, the structure is erected over a water proof ground sheet or tarp 30, or other impervious (preferably indigenous) flooring material. The ground sheet 30 may be co-extensive with the yurt footprint, or extend beyond the yurt perimeter as shown. Where the yurt 10 is used as an animal pen, the ground cloth may be omitted. The base flap of the door panel is folded back on itself twice, along parallel lines to form a triangular tube 32 which reinforces the door (also see FIG. 8A), and deflects rainwater away from any gap at the bottom of the door.

An optional guy line 34 may be used to further secure the yurt in windy environs, The line 34 is extended from holes 36 in the projecting ends of the gutters 38 to appropriate ground pegs 40, or other available trees, rock formations and the like. One or more of the wall panels 12 may include an optional window panel 42. As shown, the window panel 42 is die cut along both sides and the bottom, so that it may be opened by folding up and out, or in. Preferably it is folded outwardly as a shutter, which may be propped open with a stick so that it closes automatically by gravity. Optionally, screening or transparent sold sheeting may be used to cover the window opening, and the panel 42 serves as a shutter. The window material may be light weight transparent plastic sheet that is glued or fastened to the exterior wall by fasteners (such as 20, not shown), as needed. This embodiment of the window system may include a compressible, foam plastic sealing strip that includes self-stick adhesive having peel-off cover strip on opposed sides. The cover strip is peeled off one side of the foam strip, which is then placed adjacent the marginal edge of the sheet of window plastic all around the perimeter. The exposed cover strip is then peeled off and the window aligned with the appropriately smaller opening and pressed onto the wall. Edge clips may also be used to secure the window over the opening.

The side casing of the doorway is reinforced at the bottom and opening spacing is maintained by a threshold (footer) strip 44, which has upturned ends or lap panels 44a that are fastened to the vertical wall panel marginal flaps, as best seen in FIG. 8A, and Appx B, FIG. 15. This footer assembly 44, 44a is triple-folded in the center portion that lies on the ground and the upturned lap ends 44a are double-folded to provide sufficient rigidity to keep the wall panels to each side of the door properly spaced-apart in position.

In one embodiment of the inventive material used for the walls and roofing panel modules, the cellular extruded plastic sheeting is translucent milky white, so that a pleasant diffuse light suffuses the interior of the yurt structure.

FIG. 1B shows in isometric an inventive double-wall, twenty-sided "Tek" yurt 10 which includes a two-part dutch door 14a (lower portion), 14b (upper portion, see Appx B, FIG. 11) and a threshold (footer) strip 44 bridging between two solid wall modules 12a, 12b. The lower door section 14a includes a handle and deadbolt latch assembly, shown in more detail below in FIGS. 9A-9E and Appx B, FIG. 16. The upper and lower door sections can be interlocked to open together by a sliding bolt (see Appx B, FIG. 16). The window module 42 includes a depending weather flange 50 that has a notch 52 to engage a catch (not shown) on the interior wall of wall module 12c to latch the window closed. The footer strip 44 also serves as a door header and a window header, see Appx B, FIG. 10 for panel detail. A portion of the exterior panel of wall module 12a is broken away to show the optional use of insulation 54. The roofing modules 16 overhang the wall (top) eave in a soffit construction 56, shown in more detail in FIGS. 7A, 7B.

FIGS. 2A and 2B show in elevation a gutter end 38 of the inventive yurt of FIG. 1A, FIG. 2A illustrating the interleaving of roof panel 16a with roof panel 16b, and FIG. 2B illustrating in section taken along the line 2B-2B of FIG. 1A the use of bolt/washer/wing nut assembly 20 passing through aligned holes 36 to secure the adjacent panels together. To assemble the roof panels, the right edge of left roof panel 16a is folded upward along pre-creased fold line 58a and downward along pre-creased fold line 58b to form a V of the two resulting flaps 60 and 62 as shown. The fold lines are spaced inwardly from the outer right margin of the roof panel 16a to form the appropriate first and second flaps 60 and 62, flap portion 62 of the roof panel 16a being medial of the marginal flap 60. The left edge of right roof panel 16b is folded down along pre-creased fold line 58c to form a single marginal flap 64 which is then interleaved in the V of the left roof, the holes 36 aligned and the bolt and washers 20 inserted and the wingnut tightened by hand (or with pliers).

The resulting gutter assembly 38 is shown in FIG. 2B, the tightly fastened folds of the interleaved roof panels forming an interior rib 66 which serves as a tightly sealed, substantially weatherproof roof rafter member. Note the width of the flap 64 is less than the flaps 60 and 62 so that there is a channel 68 open at the end of the rib outside the yurt to serve as a gravity drain spillway for any water that might leak into the V. Note in FIGS. 1A and 1B the flaps 60-64 extend outwardly beyond the exterior wall of the yurt to direct water away from the structure 10.

It should be understood that although FIG. 2B shows assembly of adjacent roof panels 16a, 16b to produce a depending interior rib, the assembly can be reversed, with flaps 60, 62 folded down and up, respectively into an A configuration, with flap 64 folded up, resulting in exterior ribs.

FIG. 3A shows in isometric the exterior spill end of the assembled gutter construction 38 of a single-wall inventive yurt as shown in FIGS. 1A, 2A and 2B, with the numbering the same as in FIGS. 2A and 2B. In addition, this figure shows that marginal eave panels 18a, 18b are formed by folding down along pre-creased fold line 58d spaced inwardly from the marginal edge of the base of the roof panel triangle. After folding, the eave panels 18a, 18b are secured to the top of the wall panels 12a, 12b, respectively, via bolt/washer/wingnuts 20, in this case with the bolt head on the exterior.

FIG. 3B shows in isometric of the corresponding exterior spill end of the gutter 38 of a double-wall inventive yurt. In this embodiment, the roofing modules 16a, 16b has an exterior (top) roof panel that extends beyond the perimeter of the wall modules 12a, 12b, and the marginal eave panel is enlarged into a soffit panel 56 formed by folding along pre-creased fold line 58e spaced inwardly from the marginal edge of the base of the triangular upper roof panel. This soffit panel is dimensioned to span between the perimeters of the roof and the inner wall, and the detail of inter-leaving engagement with the lower roof module panel and wall module is best seen in FIG. 7.

Optional screened soffit vent holes 96 (see FIG. 3B) may be provided as needed to vent the space between the exterior roof sheet 98 and the interior ceiling sheet 100. However, as both sheets are made of double walled, cellular plastic sheeting, there is little concern for rot so that such vent holes are not necessary for satisfactory functionality of the inventive yurt.

Figure 4B:
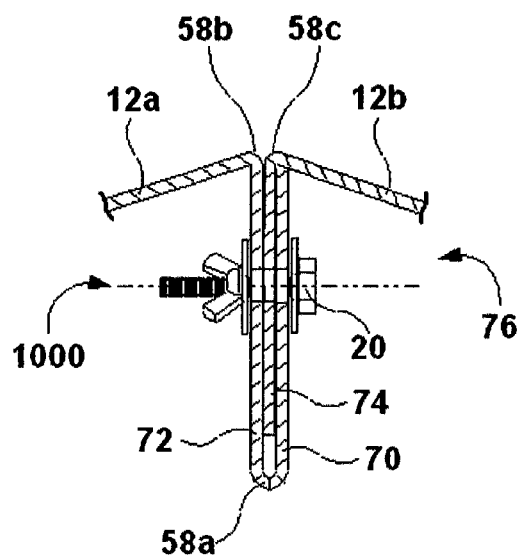
FIG. 4B is an enlarged section view of the vertical wall stud.
Figure 4A:
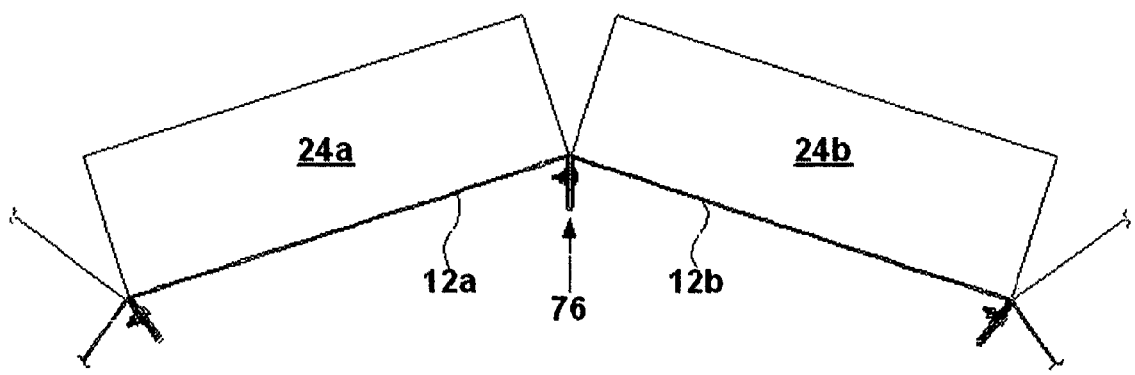
FIG. 4A is a section view through the vertical side wall of the single-walled yurt of FIG. 1A taken along the line 4-4.

FIG. 4A shows in section view the assembly of adjacent vertical side walls of the single-walled yurt of FIG. 1A taken along the line 4-4, and FIG. 4B shows an enlargement of the vertical wall stud 76 which is formed of flaps 70, 72 and 74, in a manner analogous to the above description of forming the roof rib 66, by folding along the pre-creased fold lines 58a, 58b and 58c spaced inwardly from the right and left vertical side margins of the adjacent wall panels or sheets 12a, 12b, respectively and securing with the bolt/washer/wingnuts 20. The wall studs project inwardly and are essentially wind and water proof.

Figure 5C:
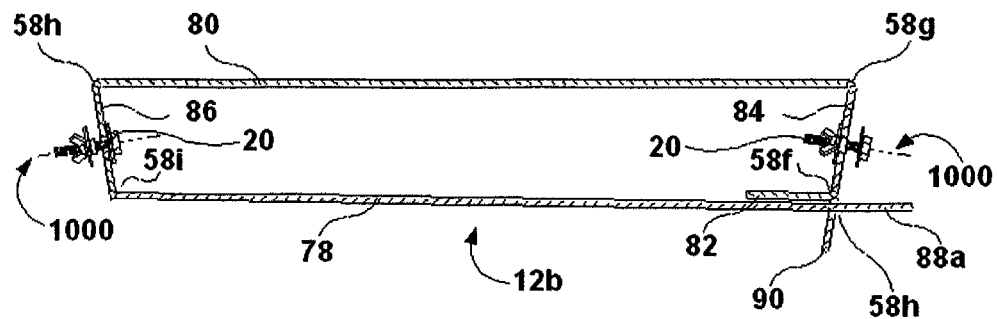
Figure 5B:
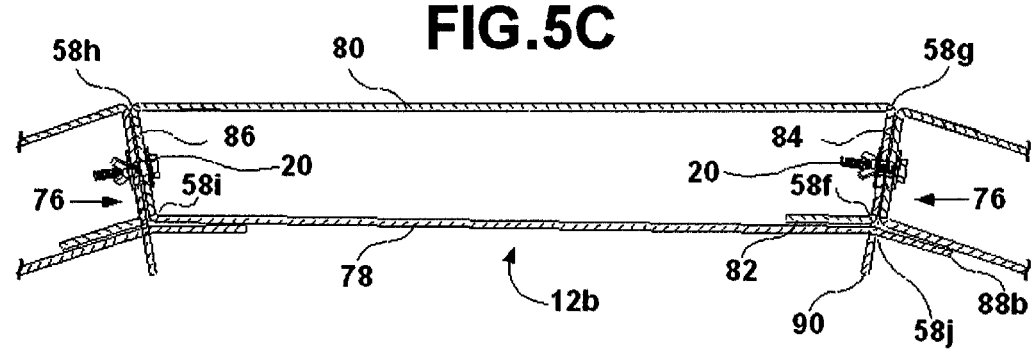
Figure 5A:
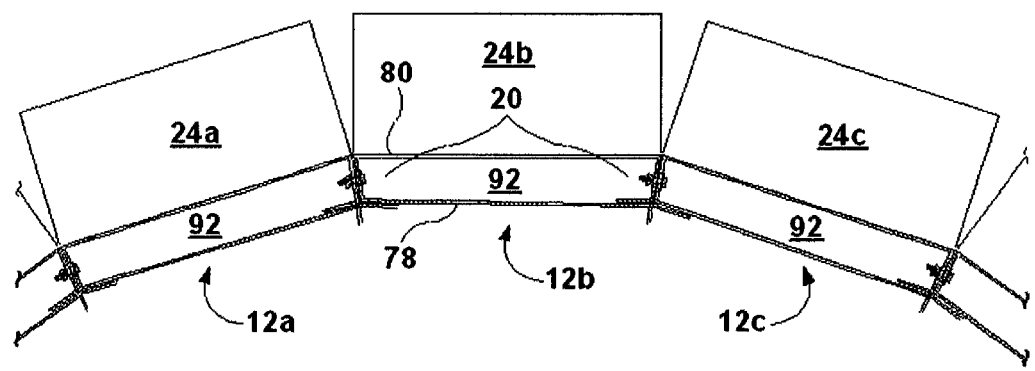

The FIG. 5 series, 5A-5C, shows in downward-looking section view the detail of the double wall module. FIG. 5A shows a portion of a vertical side wall of the double-walled yurt of FIG. 1B taken along the line 5-5, comprising a plurality of identical wall modules 12a-12c fastened together at their side marginal wall thickness flaps by bolt assemblies 20. FIG. 5B shows an enlarged section view of the assembly and fastening of adjacent wall modules, which are box constructions, closed on all sides, top and bottom. Considering together FIGS. 5A-5C, the die-cut wall panel configuration shown in Appx B, FIG. 4, and the assembly steps in Appx B, FIG. 5, the exemplary wall module 12b is formed by folding a single piece of the cellular plastic sheeting material in which the bottom marginal edge of the interior wall section 87 includes a large flap that is bent outwardly to form the horizontal base flap 24b, and the exterior wall section 80 includes a small horizontal stabilizer flap 92, the width of which is the thickness of the wall that is bent inwardly and tucked-in so that the base flap 24b is exterior of the tuck flap 92 to contact the ground or ground sheet. The stabilizer flap 92 assists in maintaining the proper wall spacing, acting as a box end flap.

The wall module box construction is formed by sequential folding a plurality of pre-creased fold lines 58f-58j as shown, which run vertically the full height of the wall module. Between a first vertical marginal edge of the double wall-forming sheet material and the first fold 58f is formed a vertical inner stop flap 82, against which the overlapping inner wall section 78 abuts on the right side. The second fold 58g forms the right side wall thickness flap 84. Between folds 58g and 58h is formed the exterior wall section 80. The flap formed between folds 58*h* and 58*i* forms the left side wall thickness flap 86, and the interior wall section is formed between folds 58*i* and 58*j*. Between the fold 58*j* and the second, opposed vertical outer marginal edge is formed a pressure seal flange flap 88. A plurality of vertically spaced-apart butterfly tabs 90, typically 2-6 per wall module, are die cut in the inner stop flap 82 and inserted through correspondingly located slits in the creased fold line 58*j*. These butterfly tabs 90 retain the wall module in its box configuration not only during assembly, but also are permanent, functioning to retain the wall module structural and shape integrity in use, thereby augmenting the bolts. The interior wall section 78 includes die cut access portal flap 94 (see FIG. 8B) which can be opened inwardly or outwardly to permit access for fitting and tightening the fasteners 20. The resulting bolted-together vertical ribs 76 are interior of the wall modules, and form vertical wall stud structures in the double-wall embodiment of the inventive yurt.

A comparison of the positions of flaps 88*a* in FIG. 5C with the flap 88*b* in FIG. 5B demonstrates that the extended flap or flange 88*a* is parallel to the inside face 82 of the wall module upon initial construction, but when that wall module 12 *b* is connected to its neighbor 12*c* as in FIG. 5B, the extended flap or flange 88*b* is forced to bend inwardly creating a pressure seal the full vertical length of the flap. This is a flex seal, that is a pressure seal formed by the flexing of the sheet material flap or flange when conforming to the surface of an adjoining panel or module sheet. Note that when the wall panel of FIG. 5C is bolted to its neighbor, the flange 88*a* flexes and is drawn planar to the neighboring wall panel's inside face 78 while retaining pressure against it and forming a very robust seal.

FIGS. 6A and 6B show details of the roofing modules of the double-walled yurt of FIG. 1B, in which FIG. 6A is a section view taken along the line 6A-6A, extended in isometric, to illustrate how the roof and ceiling sheets edge flaps are folded and interleaved, and FIG. 6B is an exploded isometric view showing how adjoining pairs are assembled to form the double roof modules. Reference may also be had to the die-cut panels of Appx B, FIGS. 1 and 2.

The exterior roof and interior ceiling sheets, 98, 100 respectively, are mirror images (chiral) forms of the same folding pattern. The ceiling sheets are generally an isosceles triangle in shape, with base flaps that form the soffit construction described above with reference to FIG. 3B, and with reference to FIGS. 7A, 7B. Each exterior roof sheets 98*a*, 98*b*, etc are identical for each module 16*a*, 16*b*, etc, and the interior ceiling sheets 100*a*, 100*b*, etc are likewise substantially identical to each other but mirror images of the exterior sheets. Note the interior ceiling sheets need not be exactly parallel to the exterior roof sheets, in which case the interior ceiling sheets are cut slightly smaller to compensate for them being in the relation to the exterior roof sheets as are concentric spheres, the interior ceiling sheet being the smaller sphere. The gutter flaps of the roof and ceiling sheets optionally may be different to accommodate the two-stage assembly of the roof module. See annotated Appx B, FIGS. 1 and 2 as examples of such flap differences.

The following description relates to the case where the exterior and interior sheets are substantially identical, it being understood that in the case where the sheets are not identical in size or exact configuration, the formation of the interleaving gutter flaps to form the radial ribs is the essentially the same. Exterior sheet 98*a* has two, substantially equally spaced pre-creased fold lines 58*k*, 58*l* the length of the left slant side of the isosceles sheet, and upward flap 102 is formed between the left margin and the creased fold line 58*k* by folding up along that line. Downward flap 104 is formed between the fold lines 58*k* and 58*l* by folding down along creased fold line 58*l*. The main outer (exterior) panel face 106 is formed between creased fold line 58*l* on the left and creased fold line 58*m* on the right. A right downward flap 108 is formed by folding down along creased line 58*m*, which is spaced inwardly from the other, right slant side of the isosceles sheet. The same fold lines 58*k*, 58*l* and 58*m* are provided in the interior, ceiling sheet 100*a*, with the folding being the reverse: down, up, up, respectively. Note on the left of FIG. 6A the up/down folds along fold creases 58*k*/58*l* forms a pair of flaps into a U, or rounded-bottom V, at the left margin of the roof sheet 98*a*, while the reverse folds along the same creases in the ceiling sheet 100*a* forms a pair of flaps having an inverted-U or rounded-top A-shape (called herein an "Inverted-U-shape"). The U-folded flaps create an upturned slot 110, while the Inverted-U-shape-folded flaps create a downturned slot 112. The left marginal Inverted-U-shape flap pair of the interior sheet 100*a* is placed in contact with the right face of the U or V flap pair of the roof sheet 98*a*.

The right flap 108 of the next adjacent roof sheet to the left fits in the slot 110, while the right upturned flap 108 of an interior sheet to the left fits in the slot 112. This is best seen in the center of FIG. 6A wherein sheets of module 16*a* lie to the left of the sheets of module 16*b*. The result is shown in FIG. 6B wherein pairs of adjacent exterior panels 98*a*, 98*b* are fitted onto the mirror pair of interior panels 100*a*, 100*b*. The interleaved sheets are then fastened together with bolt/washer/wingnuts 20 accessed through appropriately located access portal flaps 94 (an exemplary pair shown in FIG. 6B). The roof module assembly continues clockwise or counter-clockwise, as convenient, around the entire yurt, placing the interior sheets down and interleaving the exterior sheets. Alternately, the entire roof interior panel sets can be assembled by interleaving, and the entire roof exterior panel sets assembled by interleaving, then the exterior is fitted over the interior and the bolts inserted and only partly tightened until the entire roof assembly is lifted in place. Thereafter, final adjustments and alignments made, then the bolts are tightened from the interior. The result is a roof structure supported by a radial array of twenty, multi-layer interior rafters 116, which renders the roof sufficiently strong to sustain heavy loads. In actual tests, a 200# man can stand on the roof. Likewise, the roof will carry heavy snow loads.

FIGS. 6B, 7A and 7B also show the detail of the exterior soffit flaps 56*a*, 56*b*, formed at the base margin of the roof panels 98*a*, 98*b*, are folded in to overlie or interleave with the interior soffit flaps 118*a*, 118*b*, formed at the base of the interior ceiling panels 100*a*, 100*b*. As seen in FIG. 7A, the soffit flap 56 is folded in, and soffit flap 118 is folded out to when the radial margin folds of the outer roof panel 98 are interleaved with the ceiling panel 100. As seen in FIG. 7B the resulting double flap 56/118 soffit closure sits on top of, and is bolted to the top closure flaps 120, 122 of each corresponding wall module 12.

FIGS. 7A and 7B show details of the securing of a roof module to a wall module, in which FIG. 7A is an isometric, exploded view of roof module panels 98, 100 in relation to the top of a co-ordinate wall module 12, and FIG. 7B is an isometric view of the roof module 16 secured to the closure panels 120, 122 of the wall module 12 with the formation of a double layer soffit structure 56, 118 above the wall eave, which soffit structure closes off the exterior perimeter of the roof module.

An alternate, embodiment of the soffit flap construction involving interleaving of soffit flaps of both the roof and wall modules. A wall top soffit flap 120 is provided as part of the top marginal edge of the interior section of the wall panel (rather than, or in addition to, a soffit flap 118 at the base of the interior ceiling sheet as seen in FIG. 6B). This wall soffit interior flap 120 is folded outwardly and interleaved on top of the soffit flap 56 of the exterior roof panel 98 of the roof module. Optionally, a smaller top stabilizing flap 122 is provided to extend from the top marginal edge of the exterior section of the wall panel. This stabilizing flap is first folded inwardly to assist in closing the top of the wall "box", then the wall soffit interior flap 120 is folded outwardly, and the roof soffit flap 56, or and the ceiling soffit flap 118, is/are interleaved with the two wall flaps 120, 122. Optionally, a roof module base closure flap (a shortened flap 118) may be provided at the base of the interior ceiling sheet 100 that is folded up to contact the interior face of the roof sheet 98 to complete "boxing" closure of the roof module. In still another option, the soffit flap 56 may be long enough to be bent down and secured to the interior face of the double wall module. These various constructions make for rain and wind-tight seals.

FIG. 8A shows in isometric from the interior of a single-walled yurt of FIG. 1A, several side wall panels 12 and roof panels 16, terminating in a galvanized metal roof vent 22 having a collar 124 and flange 126 functioning as the central compression ring of the roof Single-wall roof panel die-cut configuration is shown in Appx B, FIG. 3. The optional window section 42 is perfed or scored through around the sides and bottom 50, and is hinged at the top along the pre-creased fold line 58n. An optional window hinge formed of a folded strip may be fastened to the window section 42 and the wall above the opening; an exemplary die-cut strip panel is shown in Appx B, FIG. 9. The door panel 14 is hinged at 76a by virtue of the left vertical marginal wall sheet or panel flap 74 being interleaved with the flaps 70, 72 of the wall panel 12b (see also FIG. 4B). Optionally, a door hinge panel may be used, see Appx B, FIG. 9. The left marginal flap 74 (not visible in this view, see FIG. 4B) is encased in a casing V-strip that is equivalent to the flaps 70 and 72. Together they make a right side door jamb member the same as a wall rib stud 76. The bottom of the door panel 14 retains the base flap, but it has two, spaced pre-creased fold lines permitting folding into a triangular reinforcement tube 32 that is bolted 20 to the base of the door, as shown. A slot 132 is provided at the apex end of each roof rib 66 which engages the compression ring flange 126 of the roof vent collar 124, ensuring that vertical roof loads are spread equally around the compression ring. Die-cut door and wall panel configurations are shown in Appx B, FIG. 6. Note the threshold (footer) strip 44 includes up-turned ends or lap portions 44a at each end which are bolted to the vertical rib flaps 74, 76 of the two panels 12a, 12b to reinforce the base of the opening and keep the door jambs 74, 76 properly spaced apart.

Figure 8B:
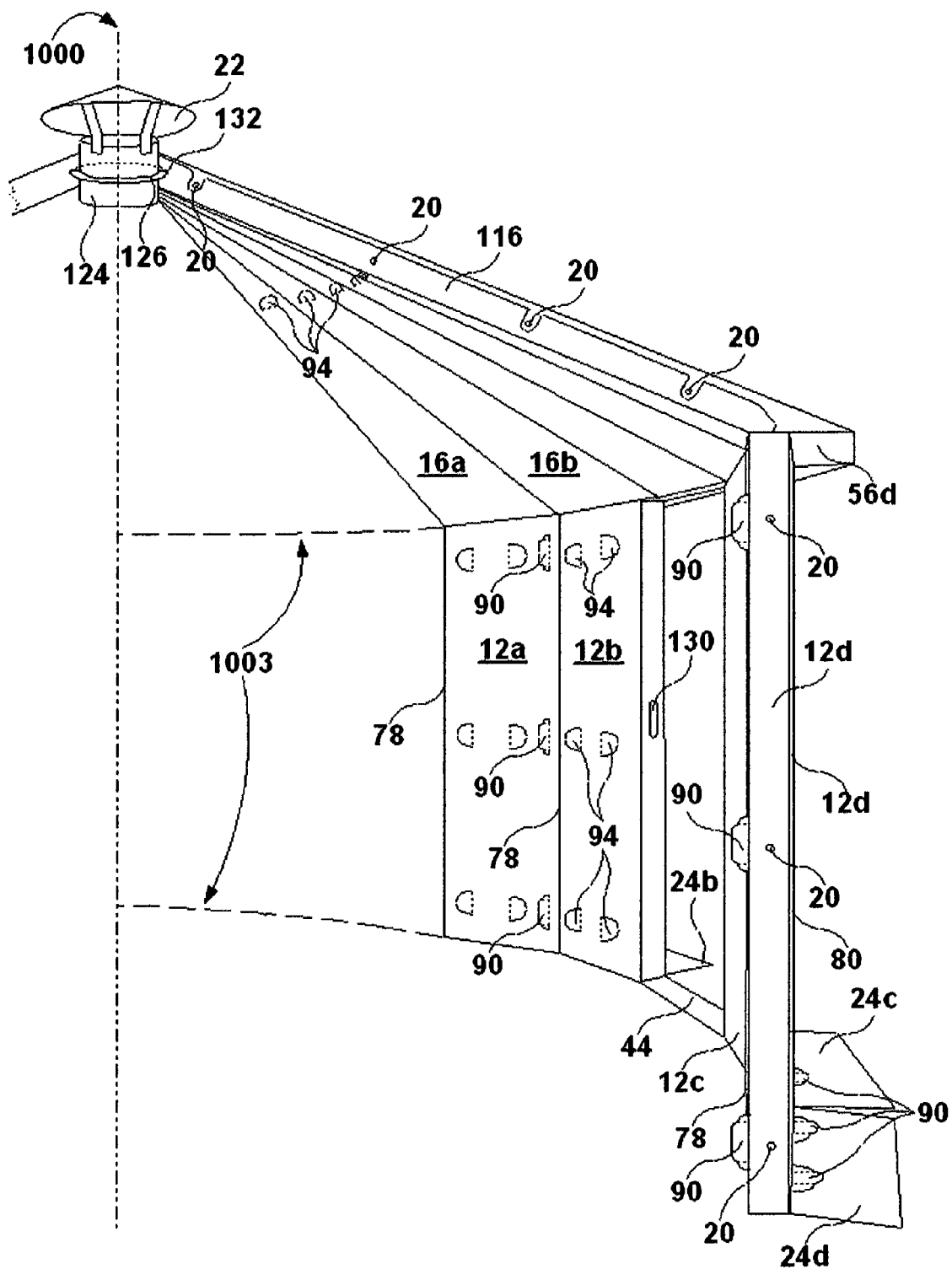
FIG. 8B is an isometric from the interior of a double-walled yurt of FIG. 1B showing several side wall and roof panels, terminating in a roof vent having a collar and flange functioning as the central compression ring, one of the wall panels functioning as a door.

FIG. 8B is an isometric from the interior of a double-walled yurt of FIG. 1B showing several side wall modules 12 and roof modules 16, terminating in a roof vent 22 having a collar 124 and flange 126 functioning as the central compression ring. The door module 14 is not shown in this view, but the slot 130 for receiving the door deadbolt, details of which are shown in the FIG. 9 series, is shown in the right side of panel 12b. See also Appx B, FIG. 14 for the die-cut of wall module 12 which includes the deadbolt slot 130. This view also more clearly shows the butterfly tabs 90, and the access portal flaps 94 on the interior wall section 78 of the wall modules 12a-12d. The door threshold strip 44 is also shown. A slot 132 is provided at the apex end of each roof module multi-layer rafter 116 which engages the compression ring flange 126 of the roof vent collar 124, ensuring that vertical roof loads are spread equally around the compression ring. The butterfly tabs 90 lying just above the ground flaps 24c and 24d serve to hold the bottom of the exterior sheet 80 of the wall module together.

Where a double-wall wall module 12c (FIG. 1B) includes a window 42, the wall may be constructed of a double-wall under-window module, the die-cut panel configuration being shown in Appx B, FIG. 13, atop which is hinged (Appx B, FIG. 9) an upper Dutch door double-wall module, as seen in Appx B, FIG. 11. Thus, the upper section of the Dutch door serves dual functions: both an upper door section and a window in the inventive double-walled yurt structure. A header 44 is required above any door or window, completing a tension ring around the top of the Yurt wall, just underneath the soffit.

The static, conical vent 22 may be any type vent, including an axially rotating type turbine vent. Where center venting is not desired, the piping may be closed off, or a smaller diameter solid plug having a compression ring flange provided, The exterior of the plug may include a "hat" type conical sheet member (of the shape shown in FIGS. 1A, 1B, 8A, 8B) to assist in preventing rain and snow melt entry at this center intersection of all the roof module panels. Where mechanical heating is provided by fire or other form of energy requiring a stove pipe, the central vent tube must be double- or triple-walled to prevent heat damage to the surrounding roof, the annulus between the inner and outer tube permitting drawing in cool exterior air to the fire box.

It should also be noted that where the push tabs at the top of the wall module is aligned with the coordinate holes in the soffit (eave) flaps of the roof module, upon opening the lower access flaps 94 at the bottom of the wall modules, the double walled yurt construction provides passive ventilation. As shown in FIG. 1B, the hollow between the interior and exterior wall panels 78, 80 may be filled with insulating material in cold weather, including native materials such as moss or grasses.

FIGS. 9A-E are a series of drawings showing a double-walled door for the double-walled yurt of FIG. 1B. FIG. 9A shows in exploded isometric the interior of the door and FIG. 9B shows the exterior of the door module 14. The door module is secured to an adjacent wall module 12 (see FIG. 8B) by means of a V-shaped hinge strip 134, one flap of which is bolted to the vertical side wall of the door and the other to the door jamb 142 (see FIG. 8B) which is the vertical side of the adjacent wall panel (also see FIGS. 5A, 5B). See Appx B, FIG. 9 for the hinge strip. The assembly of the single sheet of material that is folded to form the box comprising the door module is essentially the same as the description of the wall module 12b described above for FIG. 5B, and the full length door die-cut sheet is shown in Appx B, FIG. 7.

FIG. 9A also shows the butterfly tabs 90 extending through the face of the panel 78, and the extension flap 88 between the tabs 90 and the left marginal edge serves as the seal flange of the door. The top and bottom of the door module box 14 are closed by overlapping flaps 140 which are interlocked as shown. Various die-cuts for access portal flaps are shown at 94. The interior laterally slidable dead bolt assembly 50 is shown retracted in FIG. 9A and extended through the bolt slot 136 in the non-hinge vertical side of the door module 14 in FIG. 9B. Door handle slots 138 are provided in both the exterior face panel 80 and interior face panel 78 of the door module 14.

FIG. 9C is an exploded isometric showing the construction of door deadbolt assembly 50 from a single piece of sheet material which is folded as shown in FIG. 9D in end view, and in schematic in FIG. 9E. The sheet of material forming the deadbolt has ten pre-creased fold lines, spaced as shown in FIG. 9D which are consecutively folded form one side to the other in the double-coiled configuration shown in FIG. 9E. Reference is also made to Appx B, FIG. 8. Then the dogbone-shaped reinforcing piece 144 is folded along pre-creased fold line 58o and 58p to form a U, which is slipped over the tongue portion of the deadbolt 50, and secured in place by bolt 20 as shown. An inverted U-shaped bolt base plate 146 is positioned inside the door through access ports 94a (FIG. 9A) and secured with bolts to both the inside and outside faces 78, 80. The deadbolt 50 is positioned to laterally slidably rest on the base plate 146 by insertion through the door module bolt panel 150, FIG. 9B, before the butterfly tabs 90, seen in FIG. 9A, are engaged.

The deadbolt tongue 148 is positioned to pass through slot 136, and the butterfly tabs 90 are engaged, closing the door module box 14. Then each end of a handle 46, comprising an elongated strap with butterfly tabs at each end, is inserted through the door handle slots 138 in both the inside and outside faces 78 and 80 with the butterfly ends pressed through slots 152 in the deadbolt 50 (e.g. with a flat blade screwdriver). The slots 138 permit the deadbolt to be moved laterally as shown by Arrow A, sliding on the base plate 146 with the reinforced tongue 144 passing through the slot 136 in the door margin, and thence into engagement with the slot 130 (FIG. 8B) in the jamb of the adjacent wall module 12b. The bolt can be locked in the extended (closed) position by means of a pin or bolt 154a which passes through a hole in the door interior panel 78 and into a hole 154b in the deadbolt 50 (FIG. 9C).

Figure 10:
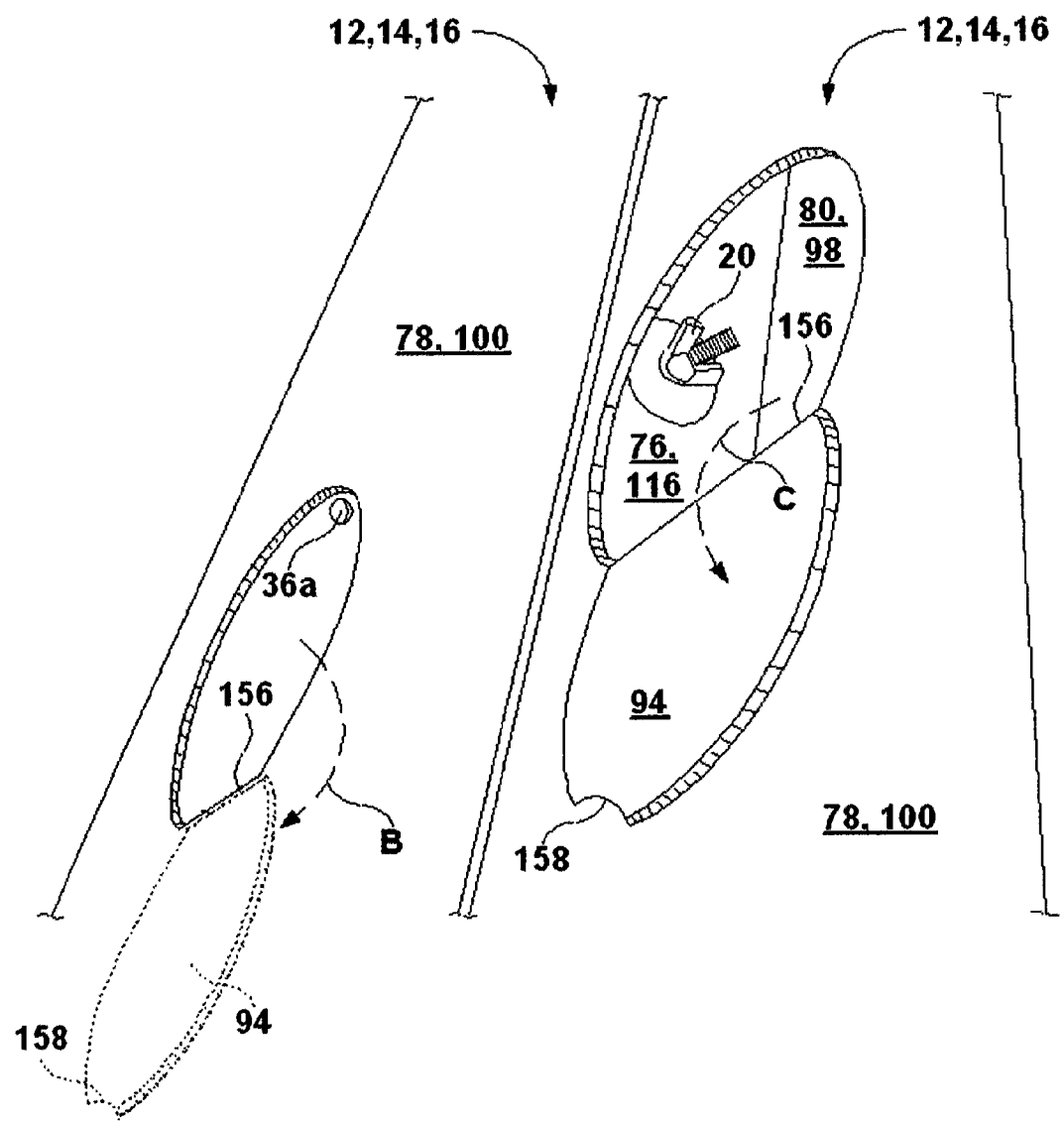
FIG. 10 is an isometric view of the fastener connection of two double wall or roof panel modules through suitably placed access flaps on the interior panels.

There are strap handles 46 on both the interior and exterior side of the door, but the lock pin assembly 154a, 154b is preferably positioned only on the interior side. Where an exterior lock is desired, a hasp type lock may be bolted through the double wall construction in a conventional manner. construction and the lock base on which it rests as well as the bolt end and bolt locking bolt; and FIGS. 9D, 9E show an end view, and schematic, respectively, of the deadbolt body cross section;

FIG. 10 is an isometric view of the connection of two double wall, roof or door modules 12, 14, and 16, showing the use of the die cut access portal flaps 94 for access to securing bolt/washer/wingnut assemblies 20 through holes, such as 36a. Note the partial circular die cut of the access portal flaps 94 include a pre-creased chord section 156 that permits the access flap 94 to be folded inwardly as shown by Arrow B on the left, and outwardly as shown by the Arrow C on the right. Note also the finger-sized half moon cut-out 158 which permits pulling the access portal flap 94 closed by hand.

FIGS. 11A and 11B are a pair of drawings showing an example of a connecting tunnel assembly 160 installed between two double-walled yurts 10A and 10B to provide a weather resistant passageway, FIG. 11A being an isometric interior view from one yurt into another, and FIG. 11B being an exterior elevations showing the tunnel 160 connecting two yurts. The tunnel assembly 160 comprises four panels in the embodiment shown, an inverted U-shaped ceiling panel 162 having left and right side lap portions, a left side vertical wall panel 164, a right side vertical wall panel 166, and a U-shaped floor panel 168 having left and right side lap portions. The ceiling panel 162 and floor panel 168 are identical; all panels are shown in die-cut form in Appx B, FIG. 12. As best seen in FIG. 11B, two yurts 10A and 10B are placed so that common roof edges 170 (see FIG. 3B, edge formed by fold line 58e) of roof modules 16A, 16B abut along a common straight line. Then the inverted U-shaped ceiling connector panel 162 is bolted in place to the walls at locations between the inner and outer panel sheet of each wall module. The connector tunnel is also bolted in a sandwich between the wall and the roof by the same bolts that connect the wall to the roof. Optionally the ceiling connector panel 162 can be bolted to the soffits of the yurts 10A and 10B. The ceiling connector panel being of width to span from inner wall to inner wall of the yurts 10A and 10B, respectively.

Next the left and right side walls 164 and 166, each of width the same as the ceiling panel is placed to span the opening between the yurt walls. Note that the bottom of each wall panel includes a ground flap 172 that overlaps the ground flaps 24 of the several wall modules of yurts 10A and 10B. The side wall panels are bolted to the side edges of the two yurt wall modules at the top. Then the U-shaped floor panel is positioned to overlie both the exposed ground flaps of the two yurts that are exposed between them and the two side wall panels 164 and 166, and bolted to the side edges of the two yurt wall modules at the bottom. Note the side wall panels are on the inside of the tunnel at the top and outside of the tunnel at the bottom, as best seen in FIG. 11B. Note the tunnel is as wide as a wall module, and may be closed off with one or more doors of the type shown in FIGS. 9A-B.

FIGS. 12A-12C illustrate in plan view examples of the wide range of architectural variety of configurations of multiple single-wall 10-side yurts 10A-10G connected to each other at common walls. FIG. 12A shows two yurts A and B connected by a common door 14a along a common abutting wall section, and each yurt having a single exterior door 14b. FIG. 12B shows a 6-yurt configuration, yurts 10A-E arrayed around and each in contact with a common wall section with a roofed common center yurt CA. In this embodiment, each of the exterior ring of yurts 10A-10E has an exterior door 14b, and each has an interior door 14a leading to the Common Area yurt, CA. FIG. 12C shows an 8-room yurt compound 10A-10G and 10V arrayed to have an Open Common Atrium, OCA. The yurts 10A and 10V serve as a common entry vestibules, which includes an exterior door 14b and a door 14a to the atrium OCA. As shown, each of the yurts has an interior door 14a to the common open atrium, OCA. However, where permitted by fire code, yurts 10A, 10B may have an interior common door in one of their common abutting wall modules making them a 2-yurt suite that has an exterior door 14b and single door 14a to the atrium OCA. Likewise other yurts can be configured with appropriate exterior, interior and atrium doors as singles, as a multi-yurt suite with only selected ones including an atrium door. The exemplary sheet material forming the wall modules, whether single or double-walled is robust, for example the material cannot be easily punched-through. Of course it will be clear to those skilled in the art that these configurations are only exemplary, and a wide variety of configurations are possible by placement of doors or removing common wall sections as needed or desired. Further, doors can be substituted for wall panels, and vice versa, as needs exist.

The gutter tie-down holes 36 also permit conjoining single walled yurts together by passing bolts or lashing through aligned holes. To more securely conjoin single walled yurts, the eave flap of one may override the roof of the other, and the eve flap of the second folds up against the inside of the ceiling of the first. These eave flaps are then bolted or glued to the respective roof panels of the other yurt. That provides a lateral gutter. Likewise, the vertical wall ribs may be folded back into the respective conjoined yurts at opposite sides of the common entry to provide a weather tight seal.

FIGS. 13A-13C illustrates in plan view examples of the wide range of architectural variety of configurations of multiple double-wall 20-side yurts 10A-10J connected to each other via connecting tunnels 160. FIG. 13A shows two yurts connected by tunnel assembly 160 and each having an exterior door to the outside 14b, and a single, optional interior door 14a at the yurt B end of the tunnel. FIG. 13B shows a 6-yurt configuration with a roofed central area CA that is common by virtue of the interior doors in each of the five outer yurts 10A-E. In this embodiment, each of the outer yurts has an exterior door. FIG. 13C shows a 10-room yurt compound, yurts 10A-10J arrayed in a circle with an open common atrium, OCA in the center. In this non-limiting embodiment, where permitted, only yurts 10A and 10F are provided with exterior doors (although normally each yurt would have an exterior door), and each has a door 14a to the OCA. In addition, each tunnel has a door at one end. Note that the creation of open-space enclosing configurations of the inventive yurt structures permits formation of a relatively "defensible" perimeter formed by mutually connected yurts. Such a defensible perimeter is of use, for example, for animal husbandry and for the creation of a compound which is easily controllable. Such a compound is of use both to residents in dangerous social environments, such as refugee situations, and for aid personnel who must control relief materials stored inside. By way of example, the following are dimensions of the single and double-wall inventive yurts described above.

| Single-walled 10-Side Yurt-type Shelters of FIGS. 1A and 12A-C Interior Dimensions | |
|---|---|
| Inside Diameter | 3.35 m (11') |
| Interior Height at Wall Eaves | 1.5 m (5') |
| Interior Height at Center | 2.67 m (8' 9") |
| Interior Area | Approx. 6.43 m$^2$ (69.25 ft$^2$) |
| Interior Volume | 12.4 m$^3$ (438 ft$^3$) |

| Double-walled 20-Side Yurt-type Shelters of FIGS. 1B and 13A-C Interior Dimensions | |
|---|---|
| Inside Diameter | 9' 5.5" (2.9 m) |
| Interior Height at Wall Eaves | 1.5 m (5') |
| Interior Height at Center | 2.25 m (7' 4.5") |
| Interior Area | 6.5 m$^2$ (69.7 ft$^2$) |

Appendix B, Die-Cut Yurt Family Design Files, also attached hereto and made an integral part of the Specification, discloses in text and plan view drawings, the panel blanks, including exterior marginal configurations (geometry) for the die cutting, the interior cuts, and the preferably pre-creased fold lines by which the various panel flaps are formed by bending. The bends and flaps are called out in detail, including, for example the formation of a three inch thick Dutch door, made by folding a vertical panel horizontally twice in the middle and interlocking the then-mating edges.

It should be noted that interleaved flaps of the roof and wall sections may be glued together or caulking applied to the seams formed between adjacent modules or wall sheets, as desired or needed for additional vapor, water and wind or heat leakage.

INDUSTRIAL APPLICABILITY

It is clear that the inventive modular structures of this application have wide applicability to the temporary housing industry, namely survival shelters for campers, refugees and disaster victims. The inventive structures are light weight, can be easily carried into remote areas, are inexpensive, can be mass produced by modern carton making equipment as they comprise a limited suite of die-cuttable panels. As such, the inventive structures have the clear potential of becoming adopted as the new standard for disaster and refugee shelters, meeting all UN relief shelter standards.

Still another use for the inventive rigid-walled structures is as event kiosks, such as trade shows, art fairs and festivals, or for temporary shelters at sports and entertainment events, medical triage, rest shelters and farm stands. For event kiosks, the interior and exterior walls of the structures provide flat surfaces for display of promotional materials, artwork or photos, billboards and the like, which may be printed directly onto the surface. Note also that partial structures may be used, as two or more wall panels are mutually self-standing as they cooperatively support each other. Thus, a semicircular or quarter circle structure may be used as booths, bus stop shelters, music band shells, and the like.

It should be understood that various modifications within the scope of this invention can be made by one of ordinary skill in the art without departing from the spirit thereof and without undue experimentation. For example, the panels can have a wide range of designs to provide the functionalities disclosed herein. Likewise, the panel materials may be made of any suitable plastic, and may be laminates rather than single extrusions. The window sheets or modules may be made of transparent plastic and window openings or modules may include sections of screen to selectively permit ventilation while providing insect barriers. Likewise the upper section of the dutch door may include a hinged screen assembly. In addition, a set of die-cut sheets of the panels or module required to construct a single or a double-walled yurt of this invention may be put together in a bundle as a kit. In either of the single-wall or double wall version of the inventive yurt, one or more entire, or a portion of a, roof panel or roof module may be constructed of transparent plastic to provide additional interior light, functioning as a skylight. The roof structures of both versions of the inventive yurts are sufficiently strong to support PV solar panels, thereby making this structure largely energy self-sufficient. Guy lines may be strung through the holes 36 in the gutter ends all around the yurt, and then tensioned, to provide an additional tension ring reinforcement. This invention is therefore to be defined by the scope of the appended claims as broadly as the prior art will permit, and in view of the specification if need be, including a full range of current and future equivalents thereof.

The invention claimed is:

1. An improved, yurt-type, generally round in plan view, rigid-wall and roof modular, lightweight enclosed structure having an interior useful space and a single exterior wall, comprising in assembled use combination:
   a) a plurality of generally identical rectangular wall panels having a horizontal width and a vertical height, said panels are made of self-standing, light weight, water-resistant plastic sheet having a cellular core defined between smooth exterior and interior planar surfaces, said panels having a plurality of fold lines to define marginal flaps when folded either inwardly toward the interior or outwardly toward the exterior of said yurt structure to form a wall panel module:
      i. at least one bottom horizontal fold line spaced inwardly from a bottom marginal edge to form a ground flap when folded outwardly, said panel resting on the ground along said fold line when assembled with other wall modules to form said yurt structure, said ground flap permitting loading with objects to provide hold-down weight to assist in stabilizing said yurt structure in windy conditions;

ii. vertically oriented fold lines spaced inwardly from vertical external margins of said panel from said bottom horizontal fold line to a top marginal edge of said panel to form narrow vertical marginal flaps along each side margin of said panel when folded inwardly, and to form, when joined to adjacent panel vertical marginal flaps, vertical wall ribs on each vertical marginal edge, said ribs being internal ribs;

b) a plurality of identical generally triangular roof panels having a lateral base width substantially equal to said horizontal width of said wall panel module sheet, and a radial length corresponding to said yurt, said panels are made of self-standing plastic sheeting having a cellular core defined between smooth exterior and interior planar surfaces, said panels having a plurality of fold lines to define marginal flaps when folded either downwardly toward the interior or upwardly toward the exterior of said yurt structure to form a roof panel module:

i. a pair of first and second spaced radial fold lines spaced apart substantially equally and inwardly from one radial marginal edge of said triangular roof panel sheet, a V-shaped gutter spillway being formed by folding a first radial flap upwardly along said first radial fold line closest to said marginal edge, and a second, connected flap is formed by folding a second radial flap downwardly along said second radial fold line spaced inwardly from said marginal edge and from said first radial fold line, said upward and downward folded flaps together forming said V-shaped gutter spillway along one radial edge of said triangular roof panel sheet;

ii. a third radial fold line spaced inwardly from the opposed radial marginal edge of said triangular roof panel sheet to form a sealing flap when folded downwardly along said fold line for interleaved insertion between the V-shaped gutter spillway flaps of a next adjacent triangular roof panel sheet to form a strong structural member comprising interior radial rafter member upon said flaps being secured together;

iii. at least one lateral fold line spaced inwardly from a lateral base marginal edge to define an eave flap, said lateral fold line extending from between said V-shaped gutter spillway-forming flaps along said first radial edge of said triangular roof panel sheet to said sealing flap along said second radial edge of said triangular roof panel sheet, said eave flap being formed when folded downwardly along said lateral fold line, and said eve flap is positioned to overlap and being secured to the upper end of a vertically adjoining wall panel module;

iv. said V-shaped gutter spillway pair of folded flaps and said sealing flap converging at the upper, apex end of said triangular roof panel sheet, and each of said flaps including a horizontal center notch, spaced congruently in the three flaps, adapted to engage a flange of a compression ring assembly;

c) a vertically oriented vent structure including a cylindrical pipe having a first interior end and a second exterior end and a flange secured medially of said ends to the exterior of said pipe, said pipe and said flange together forming a compression ring assembly;

d) said plurality of wall modules comprising a first, wall module and a last wall module disposed in a generally circular array as seen in plan view with a space between said first wall module and said last wall module to serve as an entry, with said ground flaps extended outwardly, and said vertical wall ribs compressively secured together with fasteners passing through said rib sheet material to seal adjacent wall modules along adjacent said vertical marginal flap fold lines;

e) said plurality of triangular roof modules secured together along their common interleaved radial roof rafters and placed atop said plurality of wall modules:

i. so that each said V-shaped gutters fits between the in-folded vertical side flaps of said adjacent wall module panels and extends beyond the exterior periphery of said wall module panels to direct water draining off said roof away from said yurt structure;

ii. said lateral eave flaps of said roof module panels are folded downwardly over the exterior of the top of respective ones of said wall module panels and secured with fasteners thereto, with the exception that the lateral base flap of said roof module panel over said space between said wall modules is not folded, thereby forming an entry overhang;

iii. the horizontal center notches of each roof module panel is engaged with said compression ring flange; and f) so that together said compression ring, said radial rafters and said fastening of said eave flaps to said side wall module panels form a strong, light weight, water proof, semi-permanent but robust, modular, load bearing yurt-type structure the panels of which comprising an entire yurt structure are man-portable and field erectable by hand.

2. An improved yurt-type single-walled structure as in claim 1 further comprising an entry threshold assembly comprising a generally rectangular sheet of said plastic sheet material having a length greater than the width of said entry, and including at least one fold line parallel to the length dimension of said sheet permitting folding said sheet into a multi-layer strip having a width on the order of the width of the vertical flaps of said modular wall panels, said multi-layer strip having jamb fold lines inward of each of the transverse ends thereof, so that said strip is folded upwardly at said jamb fold lines to form a spaced pair of upturned end segments, each of said end segments are secured to a vertical flap of modular wall panels flanking said entry, said threshold assembly maintaining the alignment and increasing the rigidity of said vertical ribs of said modular wall panels flanking said entry.

3. An improved yurt-type single-walled structure as in claim 2 that includes features selected from at least one of: a) said fasteners are bolt/washer/wingnut assemblies; b) a hole is provided in the roof rib adjacent to the projecting exterior end to provide a tie-down for a stabilizing guy member; and c) at least one of said wall panels includes a window panel therein.

4. An improved yurt-type single-walled structure as in claim 1 wherein said vent tube includes a fitting secured adjacent the exterior end thereof selected from a conical rain shield supported on legs to provide a static vent for air and smoke from the interior of the structure, and an axially rotatable turbine vent.

5. An improved yurt-type single-walled structure as in claim 1 which includes a door panel formed from a modular wall panel secured along one vertical side flap fold line to the vertical rib flap of an adjacent wall panel to form a hinge, said door panel being free on the other vertical side and along the top edge, said door panel being selected from at least one of a single panel, a dutch door having an upper and a lower panel, a door having a window panel or screen assembly, and a door having a lock assembly.

6. An improved yurt-type single-walled structure as in claim 5 wherein said door panel base flap is folded up and back, and secured to the lower portion of the door panel to reinforce said door, and said door is secured along said hinge side by a vertical, V-shaped panel fitted between and secured to the respective vertical side flaps of said door panel and said adjacent wall panel.

7. An improved yurt-type single-walled structure as in claim 6 wherein said door panel base flap includes two additional fold lines parallel to said base flap fold line and spaced between said base flap fold line and the outer marginal edge of said base flap, the panels formed between said marginal edge and said several fold lines being formed by folding up and back along said fold lines to form a hollow triangular reinforcing tube which is secured to the base of said door to form a reinforcing member.

8. An improved yurt-type single-walled structure as in claim 1 which includes a second entry positioned flush against an entry of at least one other of said yurt structures in a conjoined cluster configuration comprising said wall and roof module panels of said cluster yurt structures being configured in preselected sizes to provide a desired eave and peak height, and structure diameter.

9. An improved yurt-type single-walled structure as in claim 5 which includes a second entry positioned flush against an entry of at least one other of said yurt structures in a conjoined cluster configuration at least one of said yurts positioned on the exterior of said cluster including a door panel for access from the exterior, and selected ones of the cluster including door panels permitting selectively closing off access between conjoined yurts of said cluster as desired, said wall and roof module panels of said cluster yurt structures being configured in preselected sizes to provide a desired eave and peak height, and structure diameter.

10. An improved, yurt-type, generally round in plan view, rigid-wall and roof modular, lightweight enclosed structure, having an interior useful space, a double exterior wall and double roof, comprising in assembled use combination:
   a) a plurality of generally identical rectangular wall panels having a horizontal width and a vertical height, said panels are made of self-standing, light weight, water-resistant plastic sheet having a cellular core defined between smooth exterior and interior planar surfaces, said panels have a plurality of vertical fold lines to define: a) an exterior wall section, b) an interior wall section, and c) marginal flaps defining wall thickness, stop and sealing sections when folded either inwardly toward the interior or outwardly toward the exterior of said yurt structure to form a wall panel module:
   i. said vertical fold lines being generally parallel and spaced from the vertical margins of said sheet material to define, considered from right to left in a sheet before folding the following panel sections: a) a narrow stop panel, b) a narrow right side wall thickness panel, c) a wide main external wall section panel, d) a narrow left side wall thickness panel, d) a wide main internal wall section panel, and e) a narrow pressure sealing overlap panel;
   ii. said narrow stop panel including a plurality of butterfly flap die-cuts that can be passed through aligned slits in the fold defining said sealing overlap panel so that when assembled by said butterfly flaps inserted through said aligned slits, a double wall module is formed that is trapezoidal in horizontal cross section, with said main exterior wall section panel slightly wider than said main internal wall section panel so that said side walls of said modular panels butt together without substantial gaps when arrayed in a circle as seen in cross-section;
   iii. said main interior wall section panel includes a plurality of flap die-cuts forming access ports suitably arrayed for installing fasteners through abutting wall side wall panels to secure adjacent wall modules together and for installing fasteners to secure roof module panels to said wall panels;
   iv. at least one bottom horizontal fold line spaced inwardly from a bottom marginal edge of one of said main wall sections to form a ground flap when folded outwardly, said panel resting on the ground along said fold line when assembled with other wall modules to form said yurt structure, said ground flap permitting loading with objects to provide hold-down weight to assist in stabilizing said yurt structure in windy conditions;
   v. said tops of said main exterior and interior wall section panels include flaps defined by horizontal fold lines spaced downwards from the marginal edge of said sheet to form overlapping top wall thickness closures to which roof modules are secured;
   b) a plurality of identical generally triangular roof panels and an equal number of identical generally triangular ceiling panels, said ceiling panels being substantially mirror images of said roof panels and together forming a spaced-apart double panel roof module, each of said triangular panels having a lateral base width substantially equal to said horizontal width of said wall panel module sheet, and a radial length corresponding to said yurt, said panels are made of selfstanding plastic sheet having a cellular core defined between smooth exterior and interior planar surfaces, said panels having a plurality of fold lines to define marginal flaps when folded either downwardly toward the interior or upwardly toward the exterior of said yurt structure to form said roof double panel module:
   i. each of said triangular roof and ceiling panels including a pair of first and second spaced radial fold lines spaced apart substantially equally and inwardly from one radial marginal edge of said triangular sheet, a U-shaped pair of flaps and an inverted-U-shape pair of flaps being formed along the left radial margin of said roof and ceiling sheets, respectively, and a downward flange and an upward flange being formed along the right radial marginal edge of said roof and ceiling sheets, respectively, alternately and overlappingly engaging said U-shaped and inverted-U-shape flap pairs with said flanges to form a triangular roof module having spaced apart roof and ceiling sheets which laterally abut adjacent roof modules along radial rafter assemblies;
   ii. each said ceiling sheets include a plurality of flap die-cuts forming access ports suitably arrayed for installing fasteners through abutting radial rafter assemblies to secure adjacent said roof modules together;
   iii. at least one lateral fold line spaced inwardly from a lateral base marginal edge of each of said roof module roof and ceiling sheets to define soffit flaps when said roof module is assembled with said soffit flaps overlapping, the exterior base edge of said roof module extending beyond the exterior perimeter of said yurt structure external wall sections when said soffit panels are secured to said top closure flaps of said wall modules;

iv. said radial rafter assemblies converging at the upper, apex end of said triangular roof modules, and each of said rafters include a horizontal center notch therethrough, adapted to engage a flange of a compression ring assembly;

c) a vertically oriented vent structure including a cylindrical pipe having a first interior end and a second exterior end and a flange secured medially of said ends to the exterior of said pipe, said pipe and said flange together forming a compression ring assembly;

d) said plurality of wall modules comprising a first wall module and a last wall module disposed in a generally circular array as seen in plan view with a space between a said first wall module and said last wall module to serve as an entry, with said ground flaps extended outwardly, and said vertical wall thicknesses are compressively secured together with fasteners passing through said wall thickness panels sheet material to seal adjacent wall modules along adjacent side walls;

e) said plurality of triangular roof modules secured together along their common interleaved radial roof rafters and placed atop said circular array of wall modules and secured to said wall top closure flaps through said soffit flaps by fasteners, and the horizontal center notches of each roof module panel is engaged with said compression ring flange; and f) so that together said compression ring, said radial rafters and said fastening of said eave flaps to said side wall module panels form a strong, light weight, water proof, semi-permanent but robust, modular, load bearing yurt-type structure the double wall and double roof modular panels of which permit passive ventilation of the interior of said yurt structure and are selectively insulatable, and module panels comprising an entire yurt structure are man-portable and field erectable by hand.

11. An improved yurt-type double walled structure as in claim 10 wherein a threshold strip is disposed bridging said entry to stabilize the base of walls forming the sides of said entry.

12. An improved yurt-type double walled structure as in claim 11 which includes a double walled door module hingedly secured to an edge of a wall module forming one side of said entry, said door module being selected from: a) a single full height door, b) a dutch door having an upper and lower section in which said upper and lower sections are selectively lockable or unlockable with respect to each other, c) a dutch door having a lower section and a window or screened upper section, and d) a door having a laterally slidable deadbolt assembly disposed in the space between an exterior wall and said interior wall panel of said door, said deadbolt being selectively lockable from the interior and exterior of said yurt structure.

13. An improved yurt-type double walled structure as in claim 12 wherein at least one of said wall modules includes a hinged window structure selected from: a) a double walled window module, b) a fixed or hinged screen assembly, c) a single wall panel hinged separately from a window or screen assembly to provide for a closable shutter exterior of said window or screen.

14. An improved yurt-type doubled-walled structure as in claim 10 which includes a second entry positioned in alignment with an entry of at least one other of said yurt structures with perimeter edges of facing roof modules in close proximity, said yurts being positioned in a conjoined cluster configuration, said wall and roof module panels of said cluster yurt structures being configured in preselected sizes to provide a desired eave and peak height, and structure diameter.

15. An improved yurt-type doubled-walled structure as in claim 14 which includes a passage cover structure bridging the two aligned entries of said yurts, and optionally at least one end of said passage being provided with a hinged door module.

16. An improved yurt-type single-walled structure as in claim 12 which includes a second entry positioned in alignment with an entry of at least one other of said yurt structures with perimeter edges of facing roof modules in close proximity, said yurts being positioned in a conjoined cluster configuration, at least one of said yurts positioned on the exterior of said cluster including a door panel for access from the exterior, and selected ones of the cluster including door panels permitting selectively closing off access between conjoined yurts of said cluster as desired, said wall and roof module panels of said cluster yurt structures being configured in preselected sizes to provide a desired eave and peak height, and structure diameter.

17. An improved yurt-type doubled-walled structure as in claim 16 which includes a passage cover structure bridging the aligned entries of said yurts, and optionally at least one end of said passage being provided with a hinged door module.

18. An improved yurt-type single-walled structure as in claim 1 wherein all panels required to form said yurt are provided in the form of a related bundle of die-cut sheets selected as a complete single yurt kit.

19. An improved yurt-type doubled-walled structure as in claim 10 wherein all panels required to form said yurt modules are provided in the form of a related bundle of die-cut sheets selected as a complete single yurt kit.

20. An improved yurt-type structure as in claim 19 which kit includes all needed fasteners.

\* \* \* \* \*